Oct. 20, 1942.　　J. R. GAMMETER　　2,299,269
METHOD AND APPARATUS FOR MAKING DIPPED RUBBER ARTICLES
Filed Jan. 28, 1939　　22 Sheets-Sheet 1
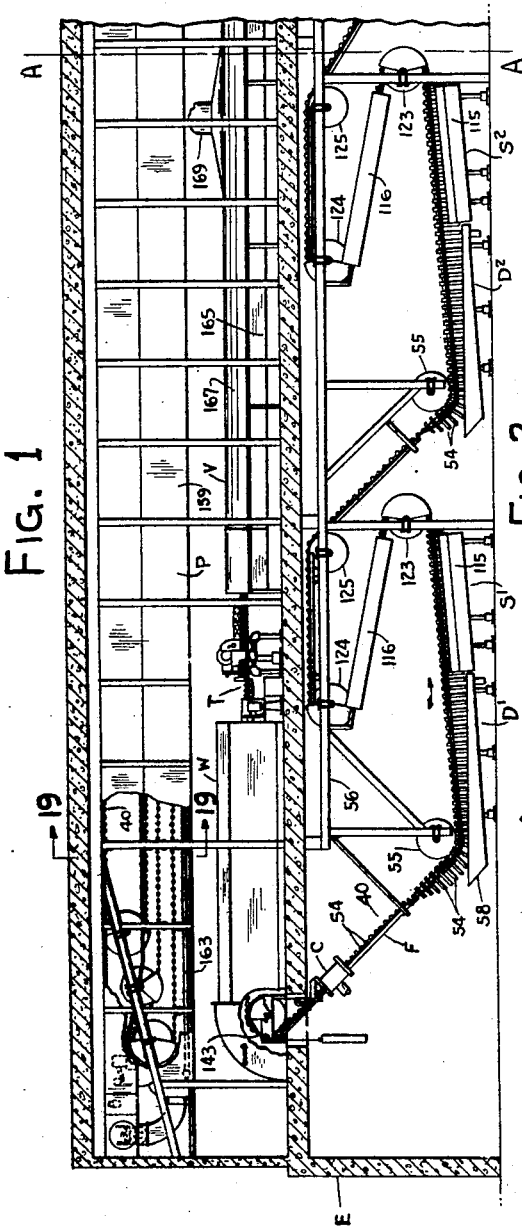
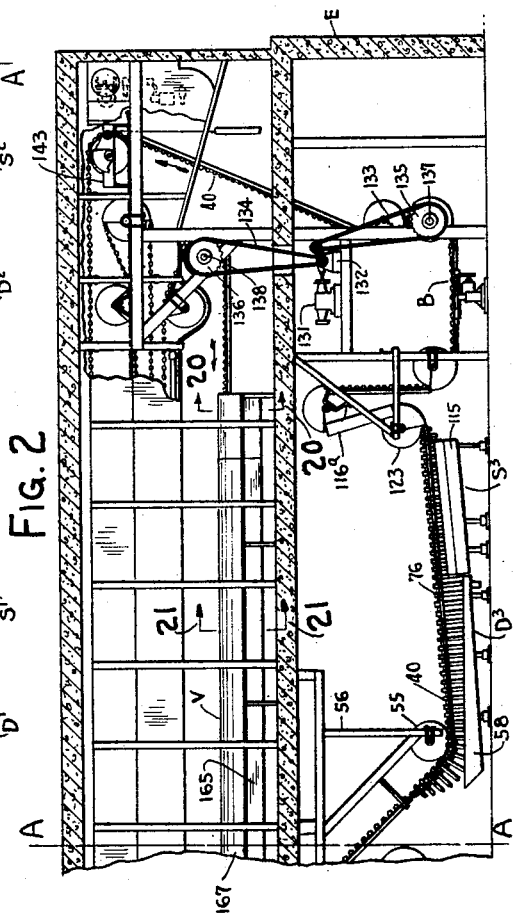
Inventor
JOHN R. GAMMETER
By Ralph Barrow
Attorney

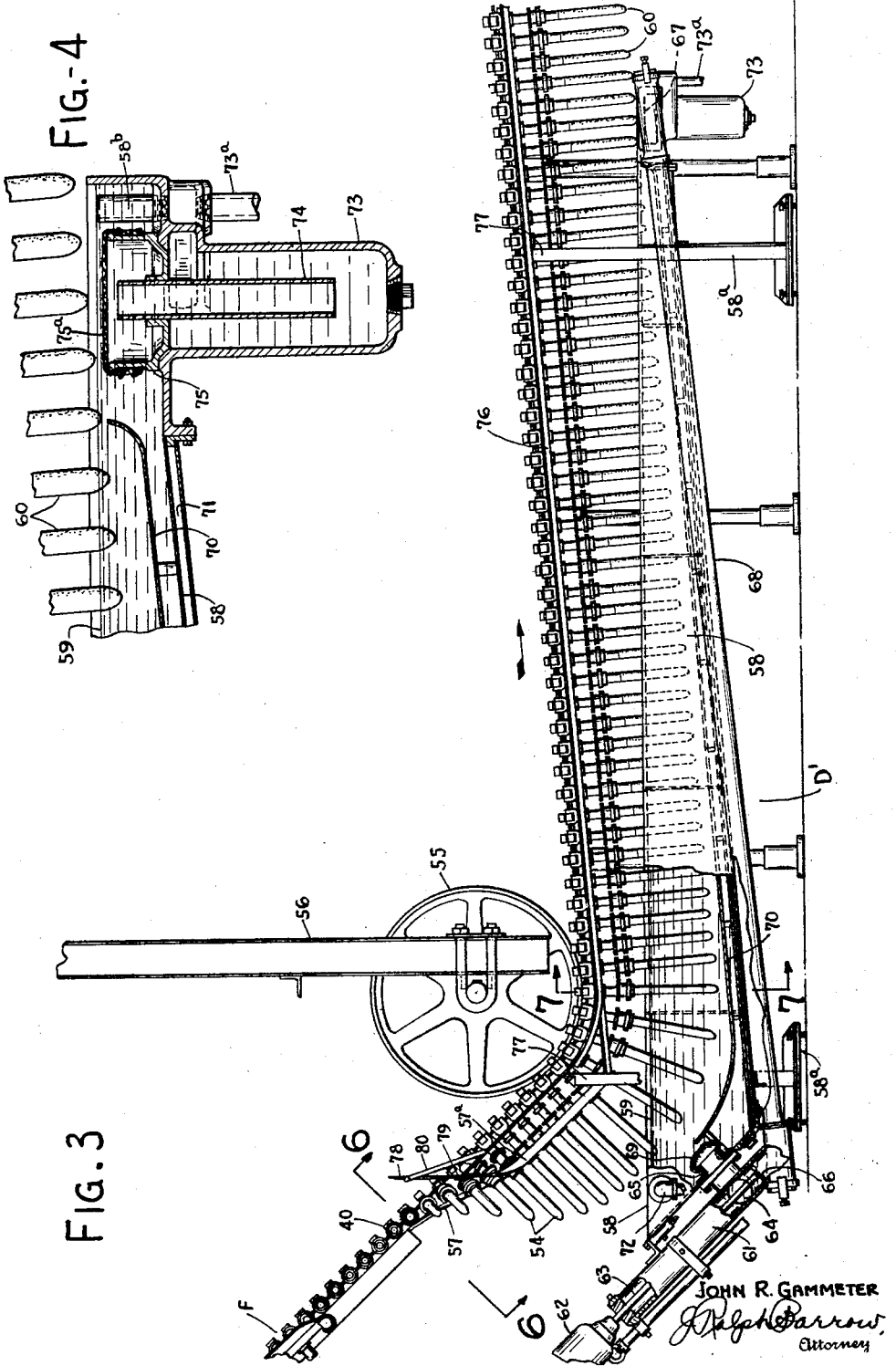

Oct. 20, 1942. J. R. GAMMETER 2,299,269
METHOD AND APPARATUS FOR MAKING DIPPED RUBBER ARTICLES
Filed Jan. 28, 1939 22 Sheets-Sheet 3
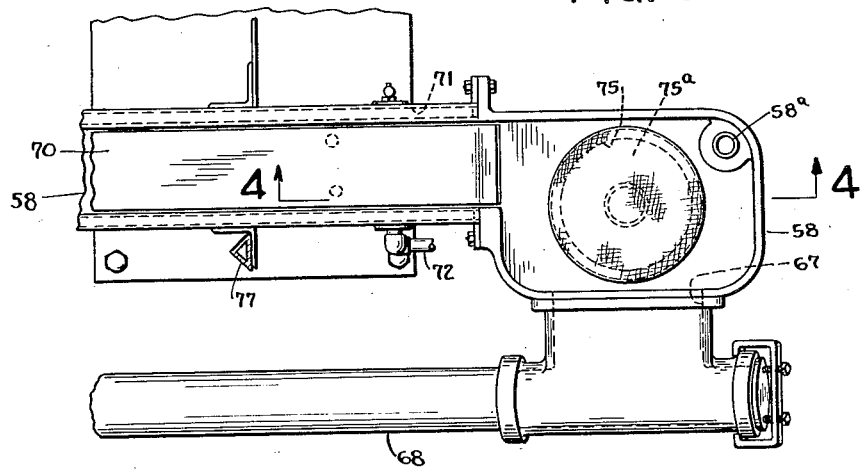
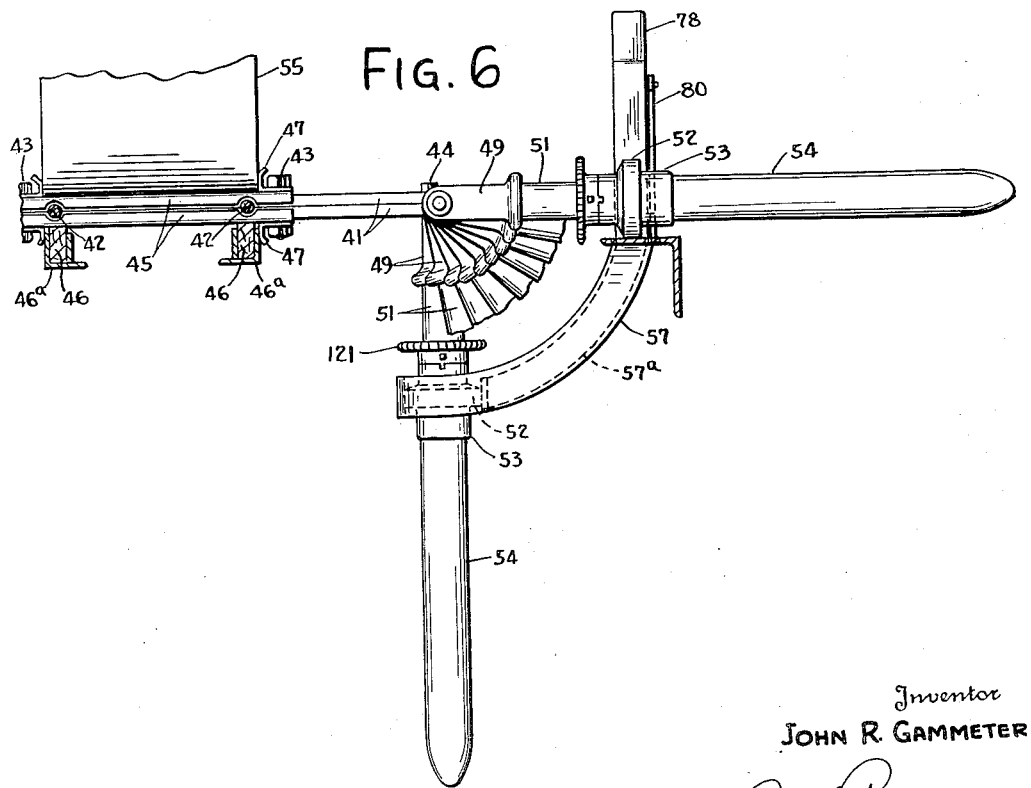
Inventor
JOHN R. GAMMETER
By Ralph Barrow
Attorney Oct. 20, 1942.  J. R. GAMMETER  2,299,269
METHOD AND APPARATUS FOR MAKING DIPPED RUBBER ARTICLES
Filed Jan. 28, 1939  22 Sheets-Sheet 4
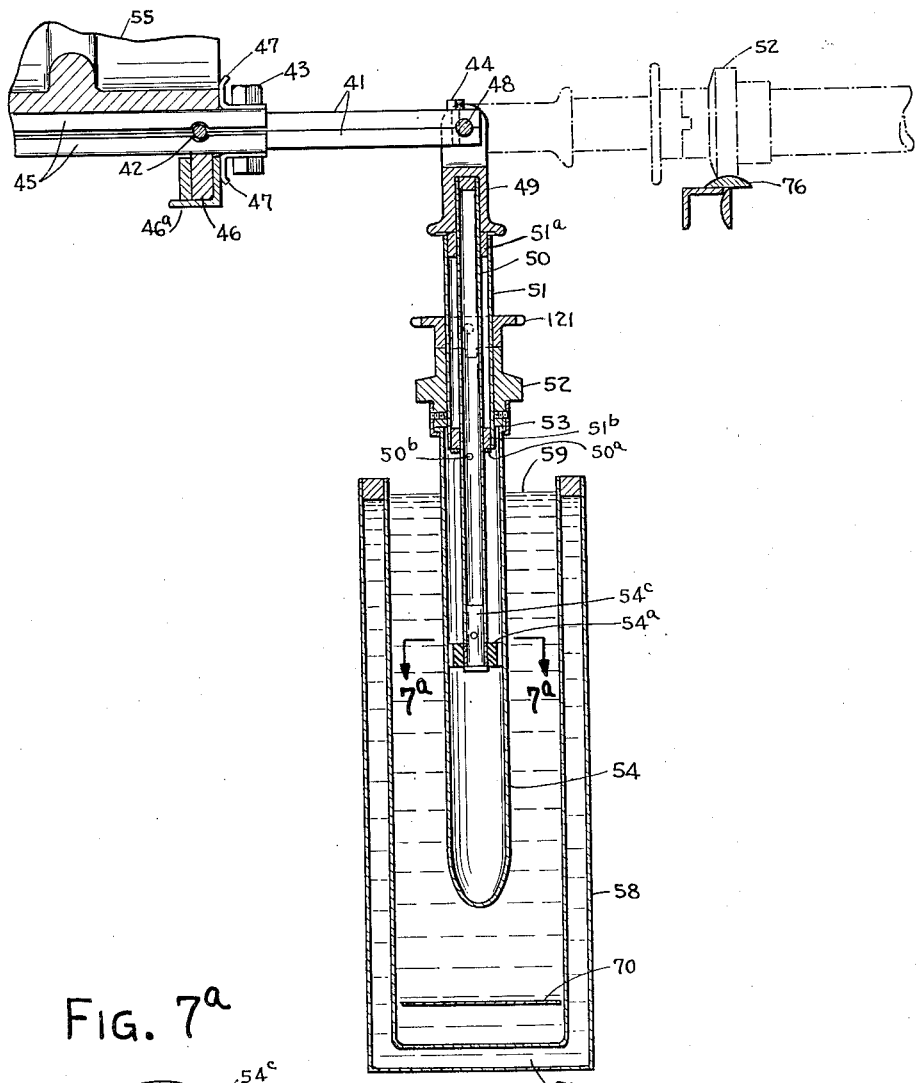
FIG. 7
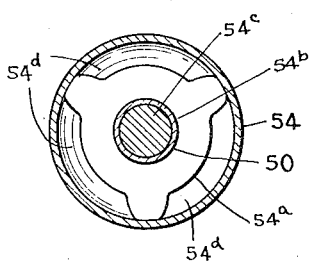
FIG. 7ª
INVENTOR
JOHN R. GAMMETER
BY
Ralph Barrow,
ATTORNEY Inventor
JOHN R. GAMMETER
By Ralph Barrow,
Attorney Oct. 20, 1942.    J. R. GAMMETER    2,299,269
METHOD AND APPARATUS FOR MAKING DIPPED RUBBER ARTICLES
Filed Jan. 28, 1939    22 Sheets-Sheet 9

INVENTOR
JOHN R. GAMMETER
BY
ATTORNEY

Oct. 20, 1942. J. R. GAMMETER 2,299,269
METHOD AND APPARATUS FOR MAKING DIPPED RUBBER ARTICLES
Filed Jan. 28, 1939 22 Sheets-Sheet 10
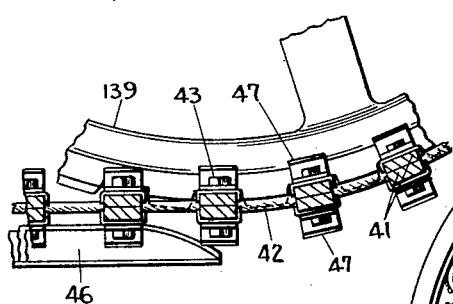
FIG. 16
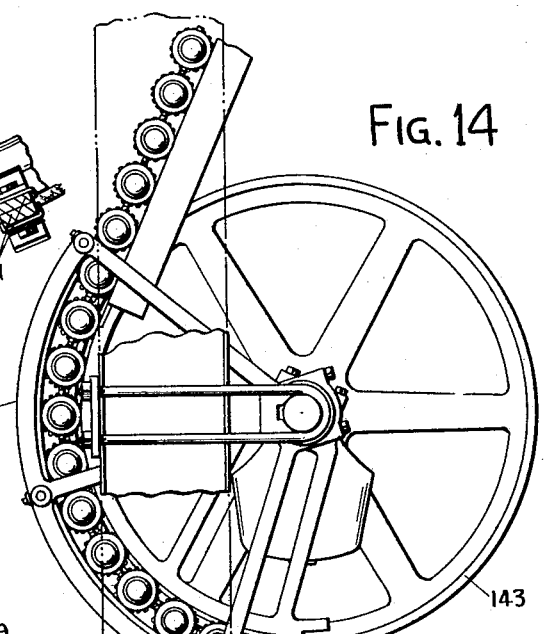
FIG. 14
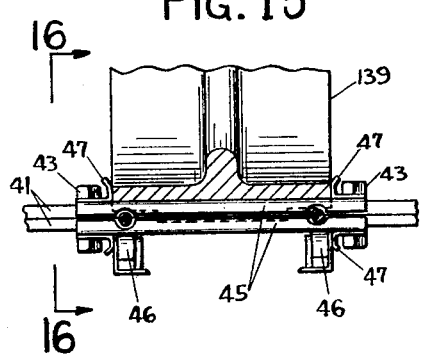
FIG. 15
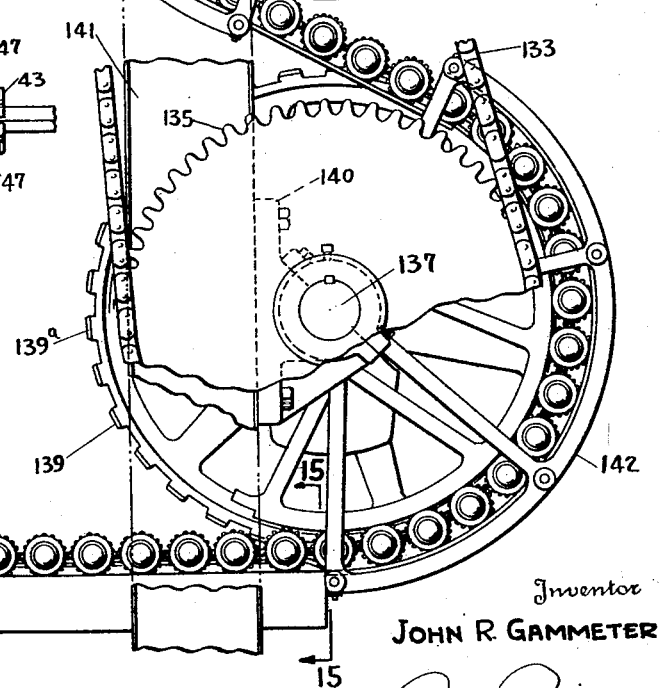
Inventor
JOHN R. GAMMETER
By Ralph Barrow
Attorney Oct. 20, 1942.  J. R. GAMMETER  2,299,269
METHOD AND APPARATUS FOR MAKING DIPPED RUBBER ARTICLES
Filed Jan. 28, 1939  22 Sheets-Sheet 11

INVENTOR
JOHN R. GAMMETER
BY
Ralph Barrow
ATTORNEY

Oct. 20, 1942.   J. R. GAMMETER   2,299,269
METHOD AND APPARATUS FOR MAKING DIPPED RUBBER ARTICLES
Filed Jan. 28, 1939   22 Sheets-Sheet 14

Inventor
JOHN R. GAMMETER
By J. Ralph Barrow,
Attorney

Oct. 20, 1942.  J. R. GAMMETER  2,299,269
METHOD AND APPARATUS FOR MAKING DIPPED RUBBER ARTICLES
Filed Jan. 28, 1939   22 Sheets-Sheet 15
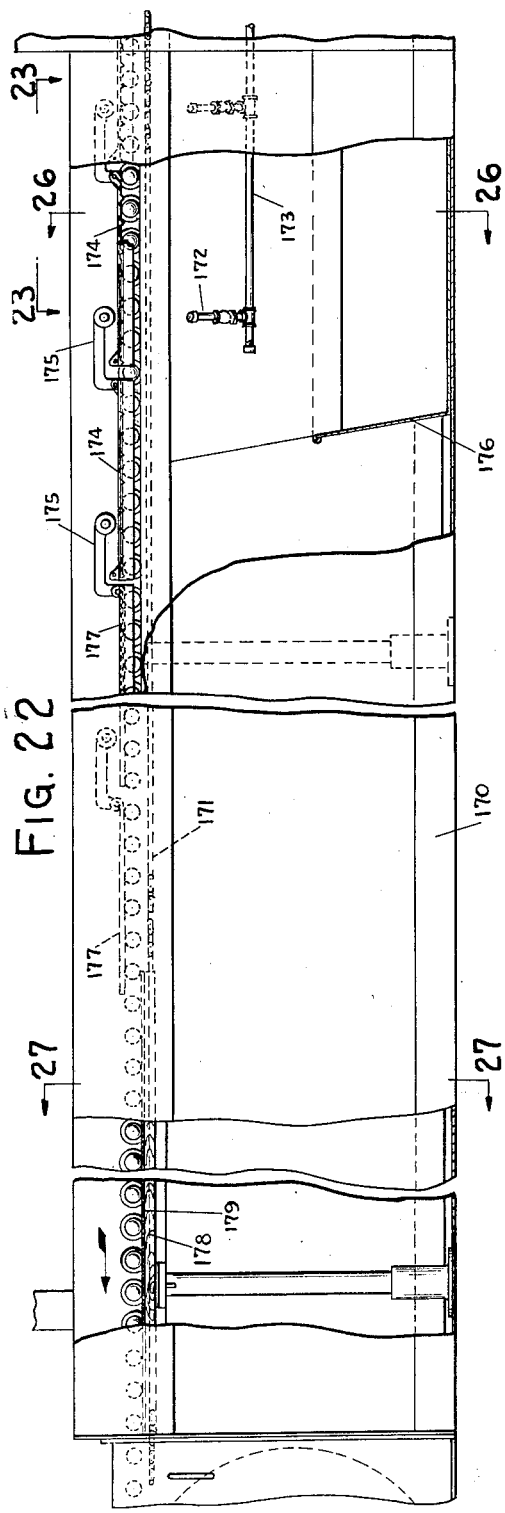
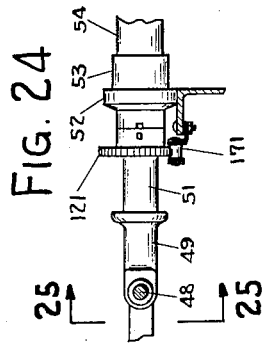
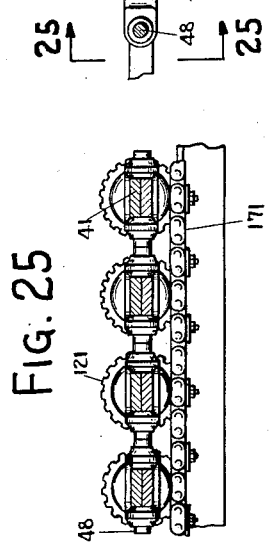
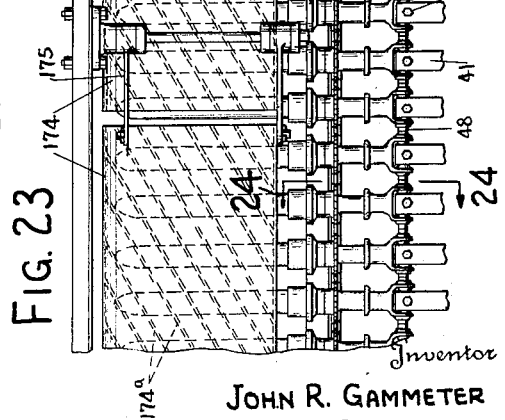
Inventor
JOHN R. GAMMETER
By Ralph Barrow,
Attorney

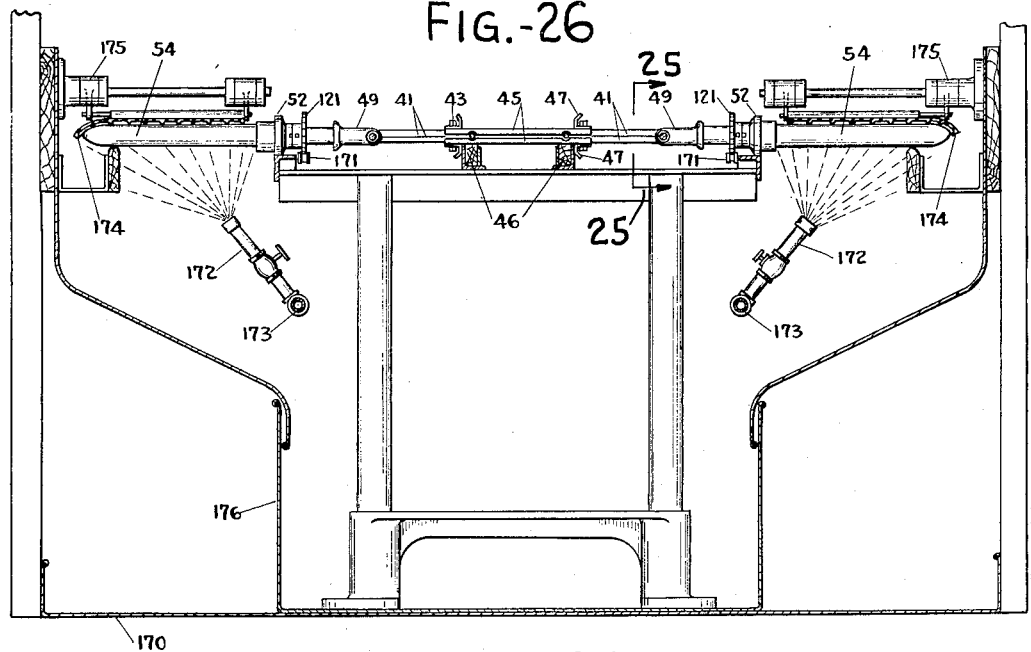
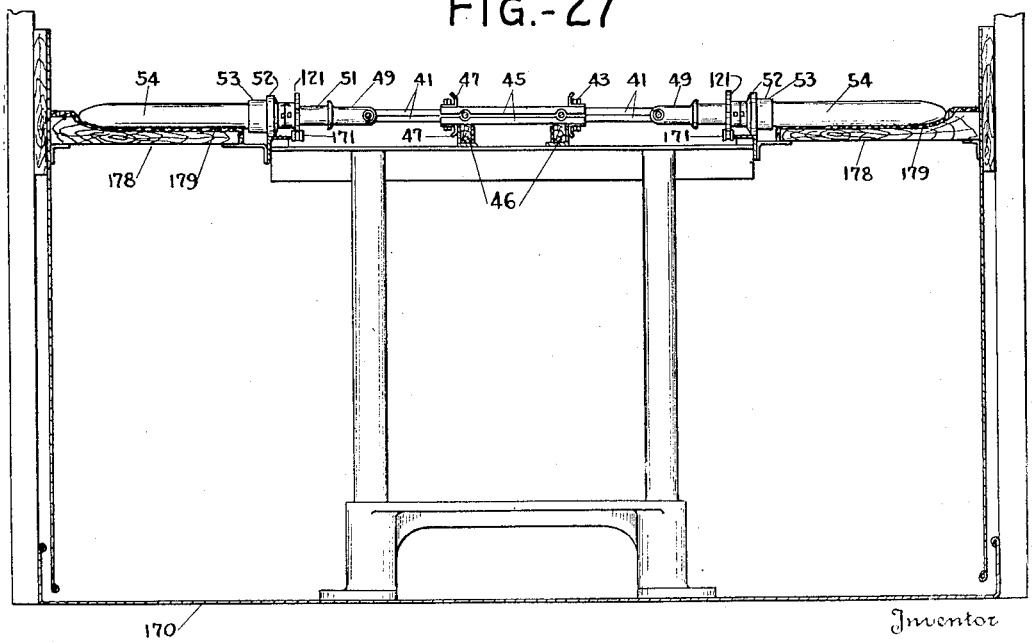

Oct. 20, 1942.                J. R. GAMMETER                 2,299,269
              METHOD AND APPARATUS FOR MAKING DIPPED RUBBER ARTICLES
                      Filed Jan. 28, 1939        22 Sheets-Sheet 17
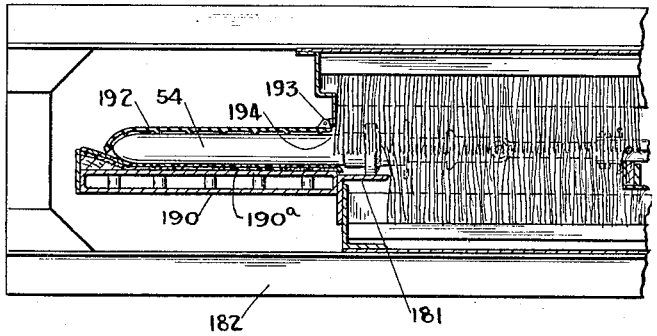
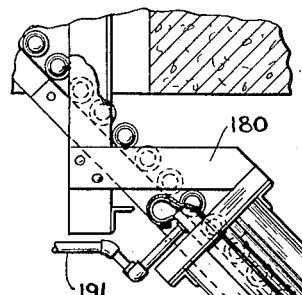
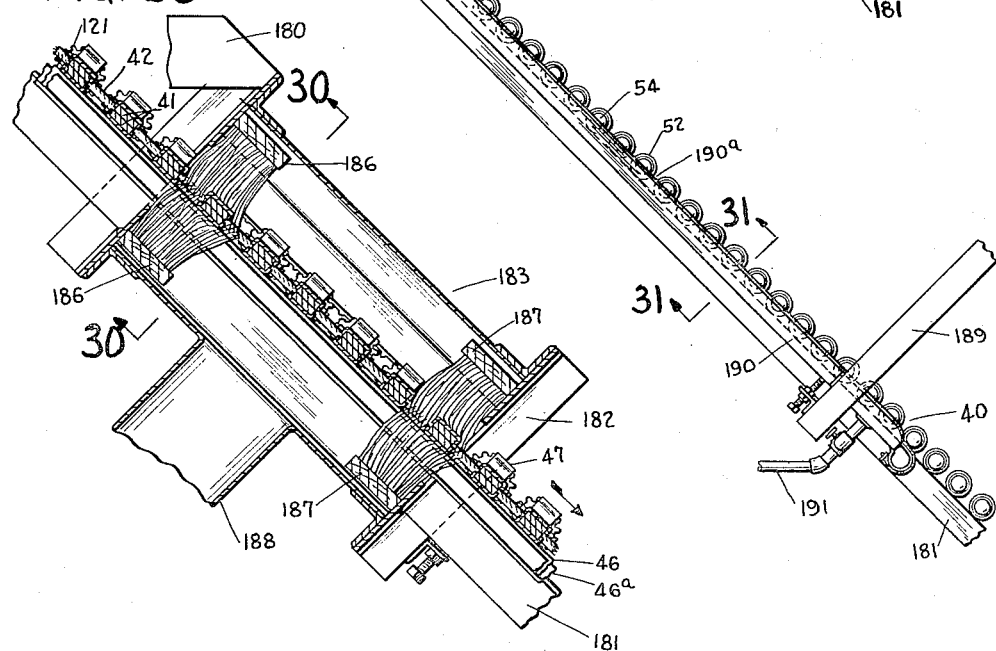
Inventor
JOHN R. GAMMETER
By Ralph Barrow,
Attorney

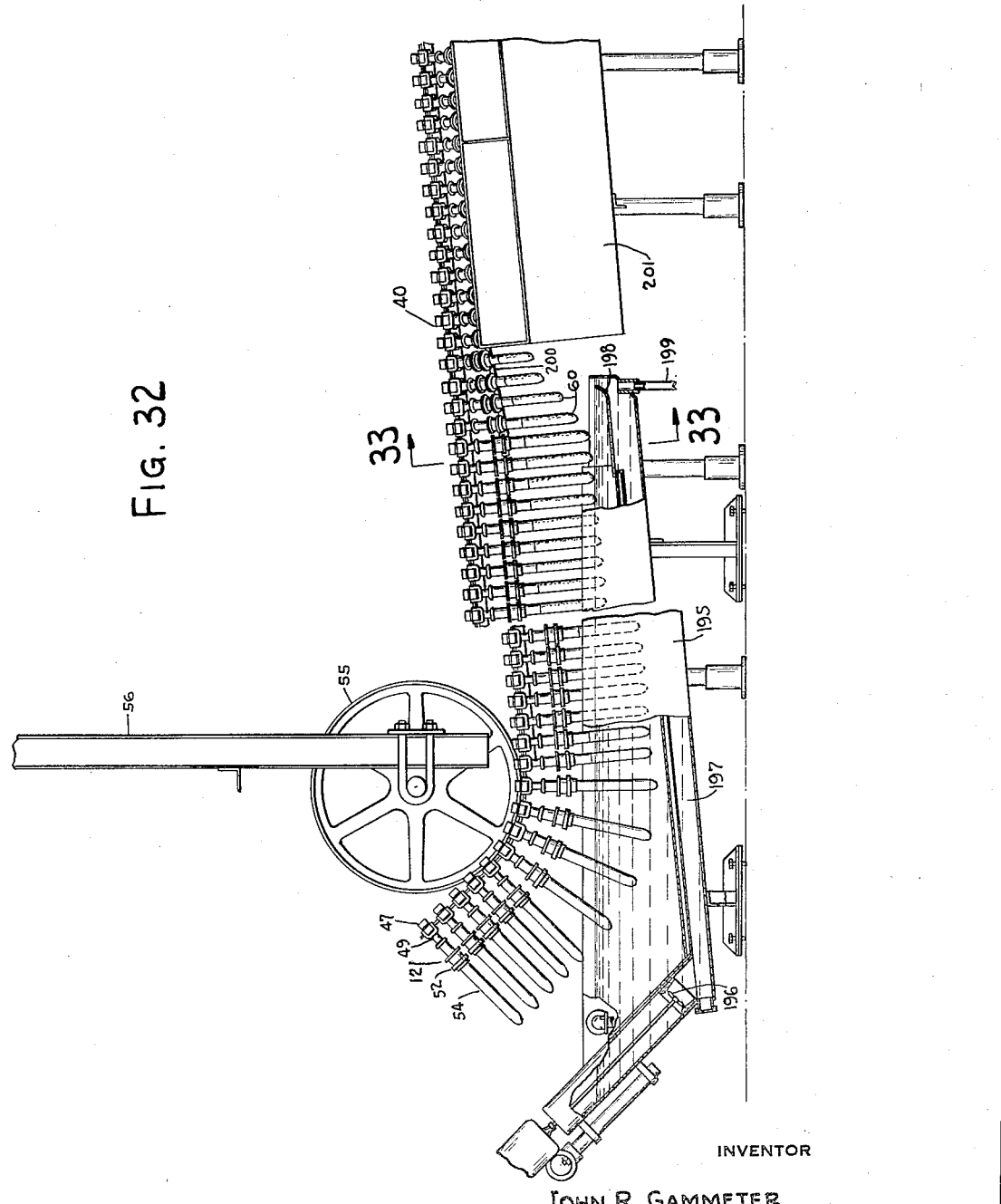

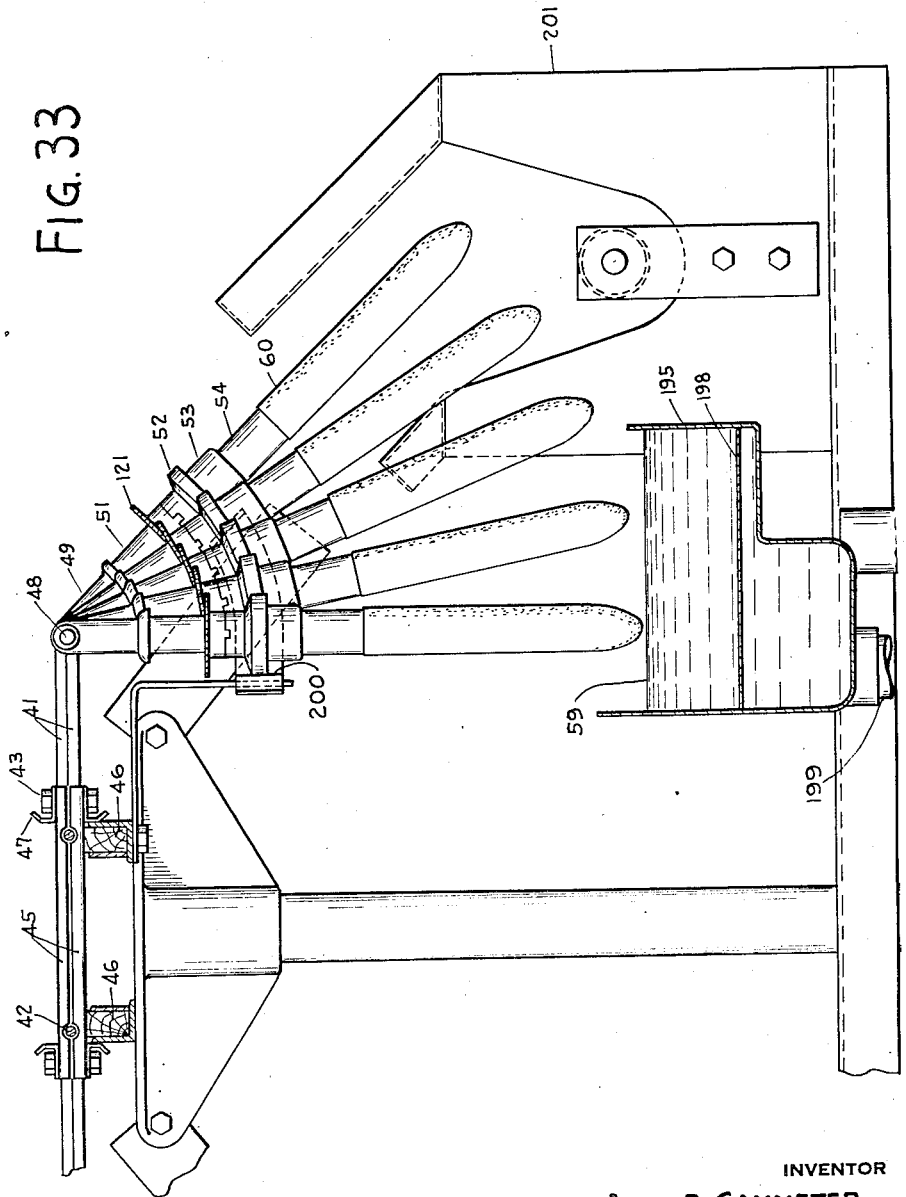

Oct. 20, 1942. J. R. GAMMETER 2,299,269
METHOD AND APPARATUS FOR MAKING DIPPED RUBBER ARTICLES
Filed Jan. 28, 1939 22 Sheets-Sheet 20
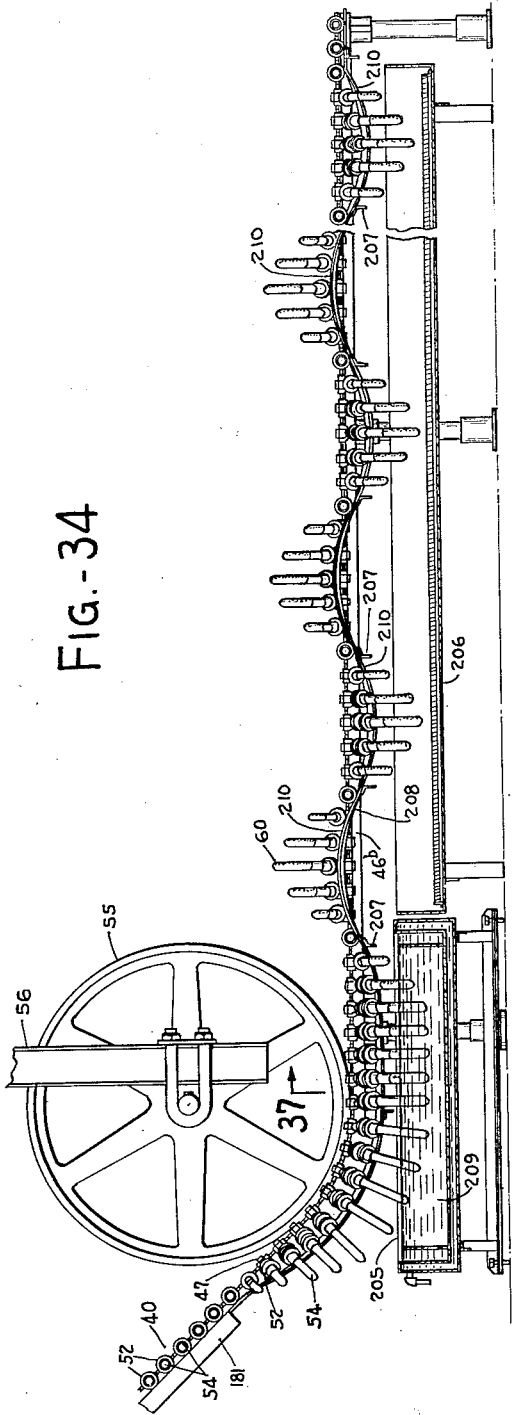
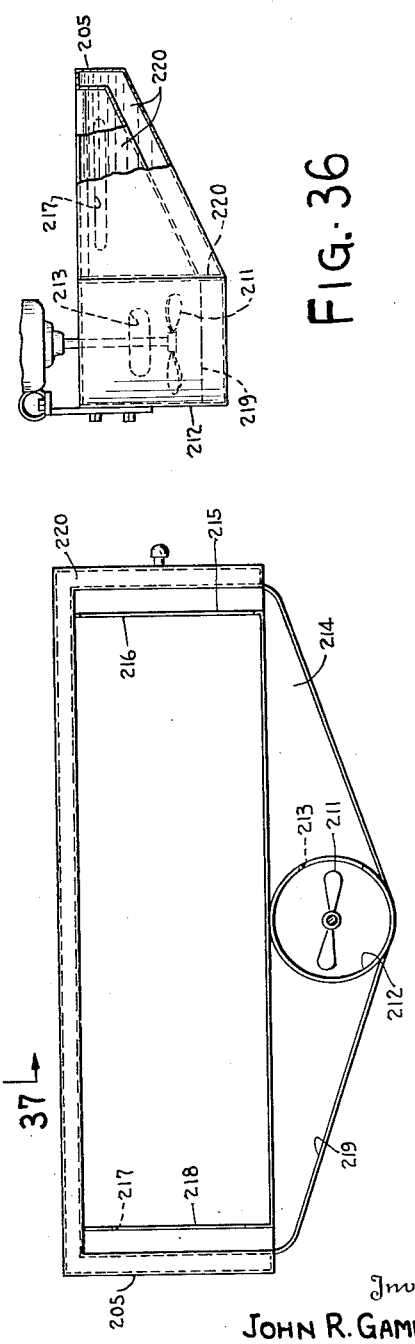
Inventor
JOHN R. GAMMETER
By Ralph Barrow
Attorney

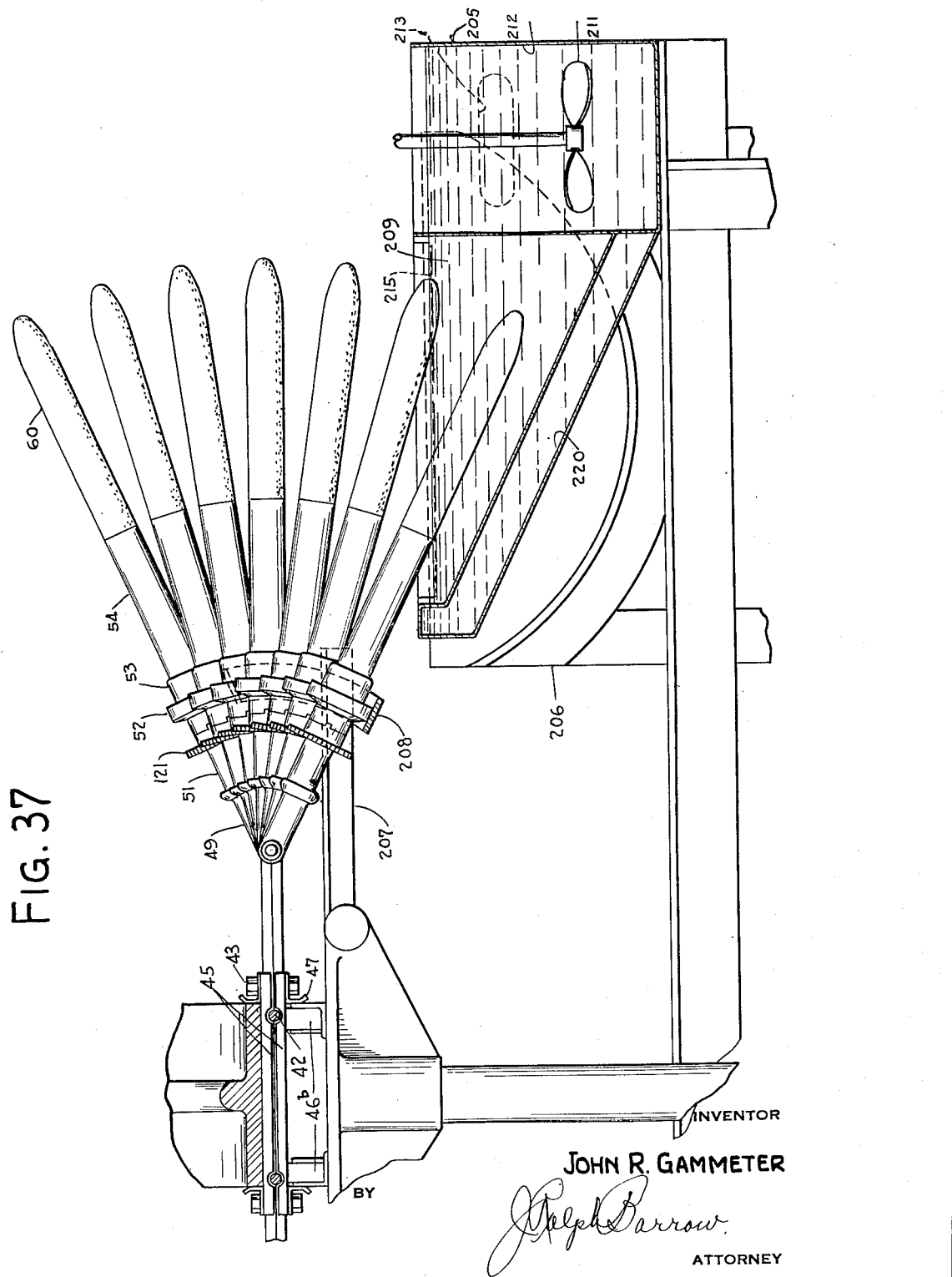

Oct. 20, 1942. J. R. GAMMETER 2,299,269
METHOD AND APPARATUS FOR MAKING DIPPED RUBBER ARTICLES
Filed Jan. 28, 1939 22 Sheets-Sheet 22

INVENTOR
JOHN R. GAMMETER
ATTORNEY

Patented Oct. 20, 1942

2,299,269

UNITED STATES PATENT OFFICE 2,299,269

METHOD AND APPARATUS FOR MAKING DIPPED RUBBER ARTICLES

John R. Gammeter, Akron, Ohio

Application January 28, 1939, Serial No. 253,322

23 Claims. (Cl. 18—24)

This invention relates to methods and apparatus for making dipped rubber articles, such as prophylactics, finger cots, and the like.

A general object of the invention is to provide an improved method and apparatus for manufacturing thin rubber articles, from latex, or other substantially non-viscous solutions or water dispersions of rubber, which are of desired uniformity and with a minimum of defective goods.

One particular object of the invention is to provide a simple, efficient method and apparatus for depositing latex or water dispersions of rubber on forms of desired shape.

Another particular object of the invention is to provide a continuous process and apparatus for carrying out the dipping of forms in latex by comparatively slow withdrawal of the forms from the latex, and preferably while internally heating of the forms, so that the latex will substantially set on the exposed surfaces of the forms as the forms are withdrawn from the latex.

Another particular object of the invention is to provide a modified process and apparatus by which the teat of rubber on the end of the form as produced by the slow-withdrawal process is effectively eliminated.

Another object of the invention is to provide apparatus for the purpose described, whereby latex or other dispersions of rubber is deposited upon forms to produce goods having a substantial reinforced area at the ends thereof.

Another object of the invention is to provide continuous conveyor apparatus for manufacturing dipped goods of the class described which is readily convertible for use with various types of dipping equipment.

Another object of the invention is to provide improved apparatus for preliminary dryings of latex or other similar material, deposited on a form by dipping, after the dippings.

Another object of the invention is to provide improved equipment for supplying latex or similar material at constant level to the dipping tank free of air-bubbles and without formation of skum.

Another object of the invention is to provide improved apparatus for automatically, smoothly and continuously conveying a plurality of dipping forms past a series of operating stations including one or more dip tanks, the latex-drying, bead rolling, pre-curing, vulcanizing, take-off, form-washing, conveyor-cleaning, and form drying equipment.

Another object of the invention is to provide improved means for washing and drying the dipping forms in continuous succession during each cycle of operation of the conveyor.

Another object of the invention is to provide apparatus for thoroughly cleaning the moving parts of the conveyor during each cycle of operation thereof, to minimize the possibility of loose particles of foreign matter becoming dislodged from the conveyor and falling in the dipping tanks or on the forms and thereby cause defects on the deposited goods.

Another object of the invention is to provide dipping forms used in manufacturing dipped goods, in which heat conducted from the conveyor to the forms is evenly distributed to the extreme ends thereof.

The foregoing and other objects of the invention are attained in the apparatus and by practice of the method illustrated in the accompanying drawings and described below. It is to be understood that the invention is not limited to the specific forms thereof shown and described.

Of the accompanying drawings:

Figures 1 and 2, when joined along the lines A—A, represent a side elevation, partly broken away and in section, of apparatus embodying and adapted to carry out the invention, such apparatus being shown installed to occupy two floors of a building.

Figure 3 is an enlarged side elevation, partly broken away and in section, of one of the dipping tank units, there being three of such tanks shown in Figures 1 and 2.

Figure 4 is a cross-section on line 4—4 of Figure 5.

Figure 5 is a fragmentary plan view of the right-hand end of the tank shown in Figure 3.

Figure 6 is a cross-section, partly broken away, on line 6—6 of Figure 3.

Figure 7 is a cross-section on line 7—7 of Figure 3.

Figure 7a is a cross-section on line 7a—7a of Figure 7.

Figure 14 is an enlarged view, partly broken away, illustrating one of the driving connections between the conveyor motive power mechanism located at the lower right-hand end of Figure 2, and the conveyor, and also illustrating typical conveyor reversing guide means.

Figure 15 is a fragmentary cross-section on line 15, 15 of Figure 14.

Figure 16 is a cross-section on line 16—16 of Figure 15.

Figure 22 is an enlarged side elevation, partly broken away and in section, of the form washing unit.

Figure 23 is a fragmentary plan view taken substantially at 23—23 in Figure 22.

Figure 24 is a fragmentary cross-section on line 24—24 of Figure 23.

Figure 25 is a fragmentary cross-section on lines 25—25 of Figures 24 and 26.

Figure 26 is a cross-section on line 26—26 of Figure 22.

Figure 27 is a cross-section on line 27—27 of Figure 22.

Figure 28 is a side elevation of equipment for cleaning the moving parts of the conveyor and for finally drying the forms.

Figure 29 is a longitudinal cross-section through the suction-box at the upper end of Figure 28.

Figure 30 is a fragmentary cross-section on line 30 of Figure 29.

Figure 31 is a fragmentary cross-section on line 31—31 of Figure 28.

Figure 32 is a side elevation, partly broken away and in section, of a modified type of dipping and pre-setting equipment.

Figure 33 is a fragmentary cross-section taken substantially on line 33—33 of Figure 32.

Figure 34 is a side elevation, partly in section, of another modified type of dipping and pre-setting equipment.

Figure 35 is a plan view of the dipping tank shown in Figure 34.

Figure 36 is an end view, partly broken away and in section, of the tank shown in Figure 35.

Figure 37 is a cross-section on line 37—37 of Figure 34.

Figure 8:
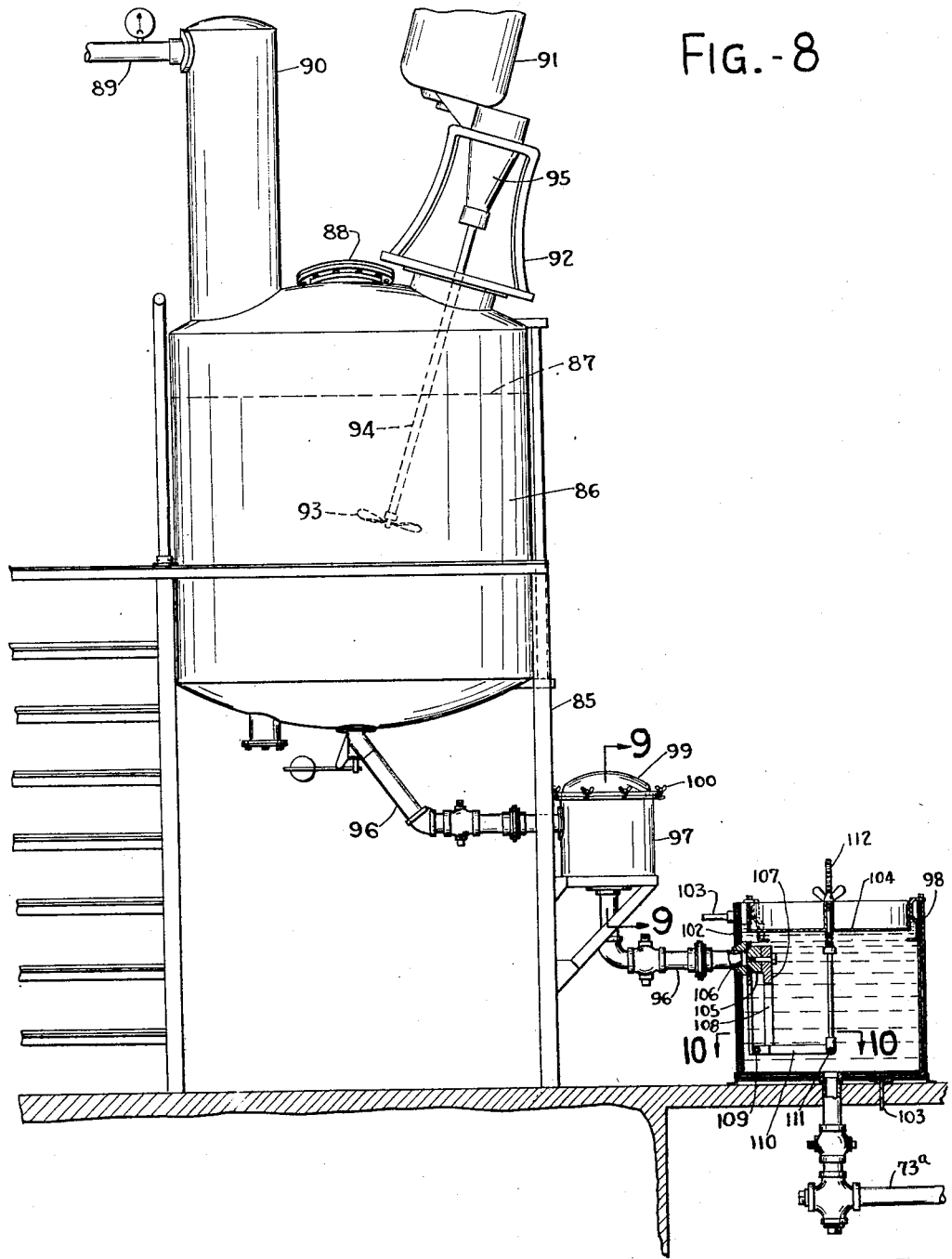
Figure 8 is an end elevation, partly broken away and in section, of equipment for supplying latex to the dipping tanks.

Referring to the drawings, the apparatus embodying the invention essentially includes a conveyor 40 for continually and progressively carrying a plurality of spaced pivotally and rotatably mounted forms operatively past one or more dipping stations such as units $D^1$, $D^2$, and $D^3$, corresponding drying stations $S^1$, $S^2$ and $S^3$ associated therewith, a bead-rolling unit B, a pre-curing or drying oven P, a curing or vulcanizing tank V, a take-off unit T, form-washing equipment W, a conveyor-cleaning device C, and finally past a form drying device F (see Figures 1 and 2). As best shown in Figures 3, 6, 7, 11, and 13, split cross-bars 41, 41, suitably apertured are clamped at predetermined spaced intervals to two or more continuous flexible steel cables 42, 42 by means of bolts 43, 43 and bolts or screws 44, 44. The bars 41, preferably being of light weight material such as aluminum, may have inwardly flanged wear-plates 45, 45 of stainless steel or other rust-proof and wear-resisting material secured to the upper and lower faces thereof by means of the bolts 43. The wear-plates 45 are arranged to slide along pairs of rails 46, 46, supported by angles $46^a$, $46^a$ as the bars 41 are carried by cables 42 past the various operations, the rails 46 being supported in parallel relation in any suitable manner according to existing conditions. At points where the direction of movement of the conveyor is reversed or substantially altered there may be provided guiding and supporting means, subsequently to be described. Guide clips 47, 47 may be secured by the bolts 43 to both the upper and the lower wear-plate 45 for slidably engaging the exterior side faces of the rail angles $46^a$ or with the sides of conveyor guide rollers positioned at various points in the apparatus, to center the conveyor 40 against lateral movement.

Fixedly held in the ends of the bars 41, as by clamping bolts or screws 44 may be pins 48, 48 for pivotally supporting form mountings 49, 49 (see Figures 6 and 7). The ends of the pins 48 may project outwardly from the mountings 49 to contact the ends of pins from adjacent mountings, thereby to provide flexible spacing means for the bars 41 (see Figure 13). Mounting 49 has fixed therein a shaft 50, preferably of material having high heat conductivity, such as aluminum, upon which may be journalled at $51^a$ and $51^b$ a sleeve 51 returned on shaft 50 by a washer $50^a$ and a pin $50^b$. Sleeve 51 may have fixed thereon a form support 52 to which is secured, as by means of a collar 53, a form 54 of heat-resisting material, preferably of pyrex or glass. Because of the heat-resisting quality of the form 54 and the relatively high heat-conductivity of sleeve 51 and support 52, heat absorbed by the metallic parts of the conveyor in passing through the various heated zones has a tendency to heat the glass form unevenly and thereby to some extent to disturb the uniformity of the deposited goods on the form. To obviate this difficulty shaft 50 preferably is extended into form 54 a suitable distance in spaced relation to the inner surface of the form so as to aid in obtaining an even distribution of heat of conduction to all parts of the form, and thereby to dry the deposited material on the exposed surfaces of the forms as they pass out of the latex. The shaft 50 may be maintained in spaced relation to form 54 by means of a spacer $54^a$, of rubber or other non-heat conducting material, having a bushing $54^b$ therein for rotational movement with the form about a pin $54^c$ secured in the end of shaft 50 (see Figure $7^a$). Spacer $54^a$ preferably is shaped substantially as shown in Figure $7^a$, with open spaces $54^d$ to allow the proper amount of heat to pass to the end portion of the form.

The dipping apparatus

The conveyor 40 is arranged to pass from the form-drying device F toward the first dipping station D¹ with the forms 54 held extended horizontally. At station D¹ the supporting bars 41, upon passing under an idler roller 55 journalled on a supporting structure 56, are guided along an inclined path (see Figure 3) by the rails 46. The form supports 52 preferably are formed as rollers adapted to engage over suitably shaped tracks 57, arranged intermediate the drying device F and idler wheel 55, to allow the forms 54 to drop by gravity to positions at right angles to the conveyor bars 41 before passing into a dipping tank 58, the latter containing latex, or other substantially non-viscous solution or water dispersion of rubber 59. An auxiliary guide track 57ª may be arranged to positively urge rollers 52 against track 57 to assure proper positioning of the forms 54 before they are immersed in the latex bath.

The angle of the inclined path which conveyor 40 follows above tank 58 preferably is relatively slight so that the forms are immersed in and translated through the latex in substantially vertical position, thereby to receive latex deposits of substantially uniform thickness thereon. Since the forms are translated through the latex along an inclined path, they progressively are withdrawn from the latex and, as will be understood, the withdrawal of the forms may be relatively slow, as determined particularly by the speed of the conveyor and the angle of the inclined path thereof. This slow rate of withdrawal of the forms provides uniform deposits thereon without appreciable flow of latex from the forms after the surfaces thereof leave the latex. The thickness of the deposits left on the forms by this process is to a great extent determined by the temperature of the form, the period of withdrawal, and by the consistency of the deposited material.

Tank 58, adjustably mounted on supports 58ª, 58ª, may be tapered toward the leading end thereof so that the bottom of the tank is equidistant from the bottoms of the forms 54 as they emerge from the latex bath 59. This shape of tank effects economy, not only of material used in building the tank, but of liquid used to keep the tank filled to the desired level.

To keep the latex circulating within the tank 58 and prevent skum forming on the surface thereof, there may be suitably secured to the large end of the tank a hollow chamber 61, extending upwardly above the level of the latex bath and having a motor 62 universally adjustably mounted at the top end thereof. A shaft 63 driven by motor 62 extends downwardly within chamber 61 past an orifice 64, the latter communicating with the interior of tank 58 through a ferrule 65, and a suitable propeller 66 on the free end of shaft 63 is adapted to force the latex through orifice 64 into the tank. An orifice 67 at the small end of tank 58, communicates, beneath the surface of the latex, with the interior of chamber 61 through a conduit 68. Motor 62 driving propeller 66 causes effective circulation of the latex through the tank toward the orifice 67 from whence it is aided by gravitation to return, through conduit 68, to chamber 61. The latex is thus circulated in the direction of movement of the forms, rather than against such movement, to prevent formation of ripples about the forms. The angular bottom of tank 58 is effective to stir the latex within the tank and further prevent formation of bubbles and skum. Ferrule 65 may have secured over the open end thereof a suitable porous bag or screen 69 for straining the latex as it passes therethrough. An overflow pipe 58ᵇ may be provided at the small end of the tank.

The numeral 70 designates a baffle plate which may cover a substantial portion of the bottom of tank 58, in spaced relation thereto, and which is readily removable for the purpose of cleaning or removing sediment from the tank. Tank 58 preferably is provided with a cooling jacket 71 supplied, through piping 72, 72, with a cooling liquid to prevent setting or coagulation of latex in the tank, due to heat.

A suitable latex supply apparatus, subsequently to be described, may be used and the small end of tank 58 may have on the bottom face thereof a downwardly extending hollow chamber or sediment trap, the latter communicating with the interior of the tank by means of a tube 74 extending through a removable filter unit 75. Communicating with the interior of tank 58, through the trap 73, may be a conduit 73ª from the supply apparatus.

The second and third dipping units D² and D³ are substantially the same as unit D¹, and therefore like numerals designate like parts (see Figures 1 and 2). When it is desired to eliminate one or more of the latex dips tracks 76, suitably supported at 77, 77, are arranged to be engaged at will by the form rollers 52 to hold the forms 54 in horizontal position as they pass over the dipping unit. For selectively engaging rollers 52 with the tracks 76, a frog or switch member 78, hingedly mounted to track 76 at 79, and normally held in inoperative upright position by a releasable bar 80, is adapted to be engaged with track 57 at a point where the forms 54 normally start to turn from horizontal to vertical position, to thereby withhold the forms from the latex tank 58 (see Figure 3).

Figure 9:
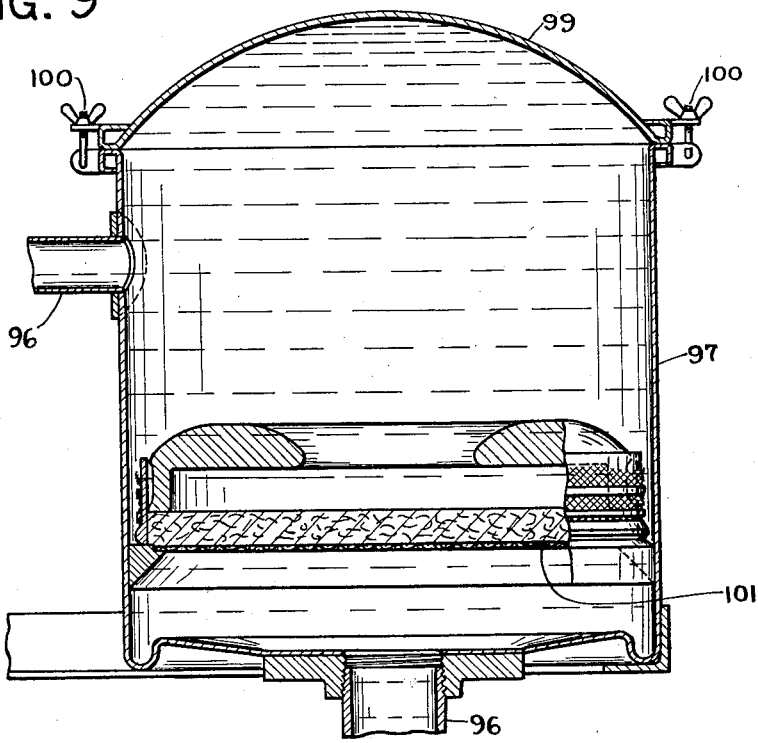
Figure 9 is a cross-section on line 9—9 of Figure 8.
Figure 10:
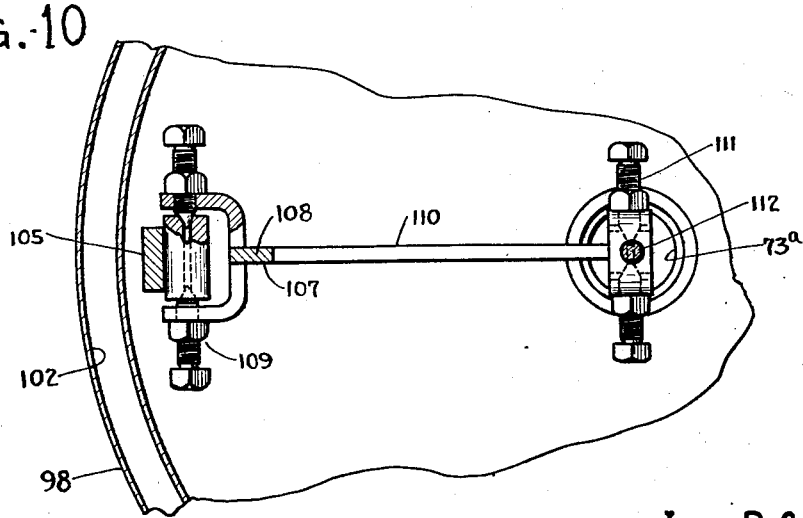
Figure 10 is a fragmentary cross-section on line 10—10 of Figure 8.

Referring particularly to Figures 8, 9, and 10, there is shown equipment for maintaining the latex in the tanks 58 at a constant level, all of this equipment preferably being located on the same floor as the tanks 58 though not necessarily in the same room. Supported on a suitable framework 85 may be a sealed vat 86 for storing or mixing latex or other substantially non-viscous solution or water dispersion of rubber 87, a removably-covered manhole being provided at 88 for injecting prepared batches of latex or other materials into the tank. Piping 89 from a suction pump (not shown) communicates with the interior of tank 86 at the top thereof through a chamber 90, the suction pressure being just sufficient to withdraw all air or vapor from the vat without affecting the latex 87. For keeping the latex thoroughly stirred and to force air bubbles therefrom there is provided a motor 91, secured on a bracket 92 on vat 86, for driving an agitator 93 on shaft 94, through a speed reducer 95.

The vat 86, through suitable piping 96 and a filter tank 97, communicates with a constant level supply tank 98, the level of the latter preferably being the same as that of the latex in dipping units D¹, D², and D³. Tank 97 is provided with cover 99 removably held against internal pressure by means of releasable clamps 100, 100, to permit removing of filter unit 101 for cleaning the tank.

Level tank 98 may have a jacket 102 for circulation of cooling fluid therein through piping 103, 103 to keep the latex cool. For maintaining the latex in tank 98 at a predetermined level there is provided a float 104 which, when the level gets below normal, actuates a valve disc 105 to open valve 106 and permit flow of latex from vat 86. Valve disc 105 is carried by one arm 107 of a crank 108 pivotally mounted in the tank at 109, the other arm 110 being pivoted at 111, to a rod 112 which is adjustably connected to the float 104. When the latex level in dipping tank 58 goes below the predetermined level thereof latex will immediately flow thereto from tank 98 through piping 73ª. This lowered level in tank 98 causes float 104 to drop and thereby open valve 106, the latter remaining open until sufficient latex flows therethrough by gravity to raise the latex in tanks 98 and 58 to proper level, float 104 then causing the valve 106 to close.

Latex drying equipment

Figure 11:
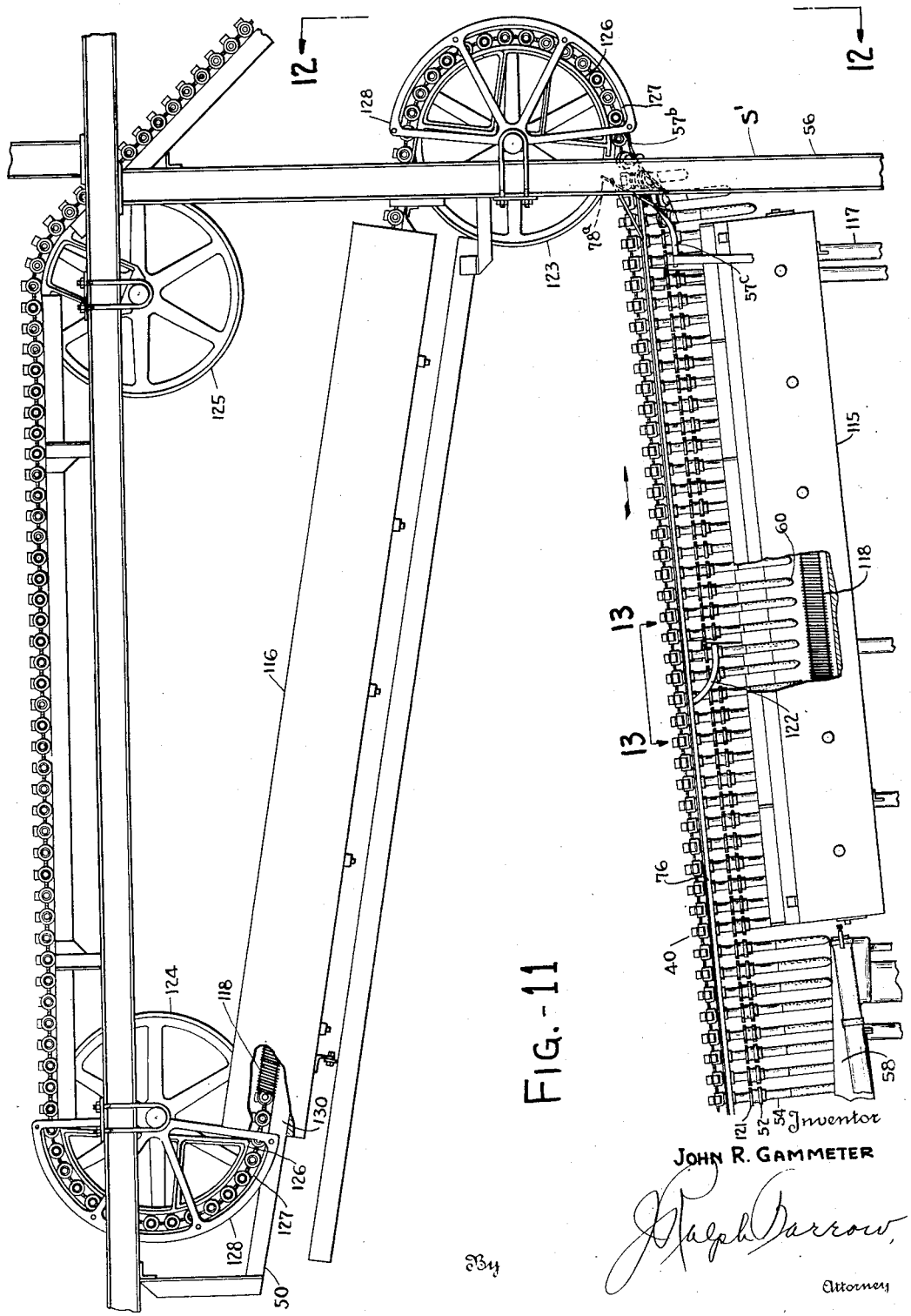
Figure 11 is an enlarged side elevation of the equipment for pre-setting the layers of deposited latex following each dipping operation.
Figure 12:
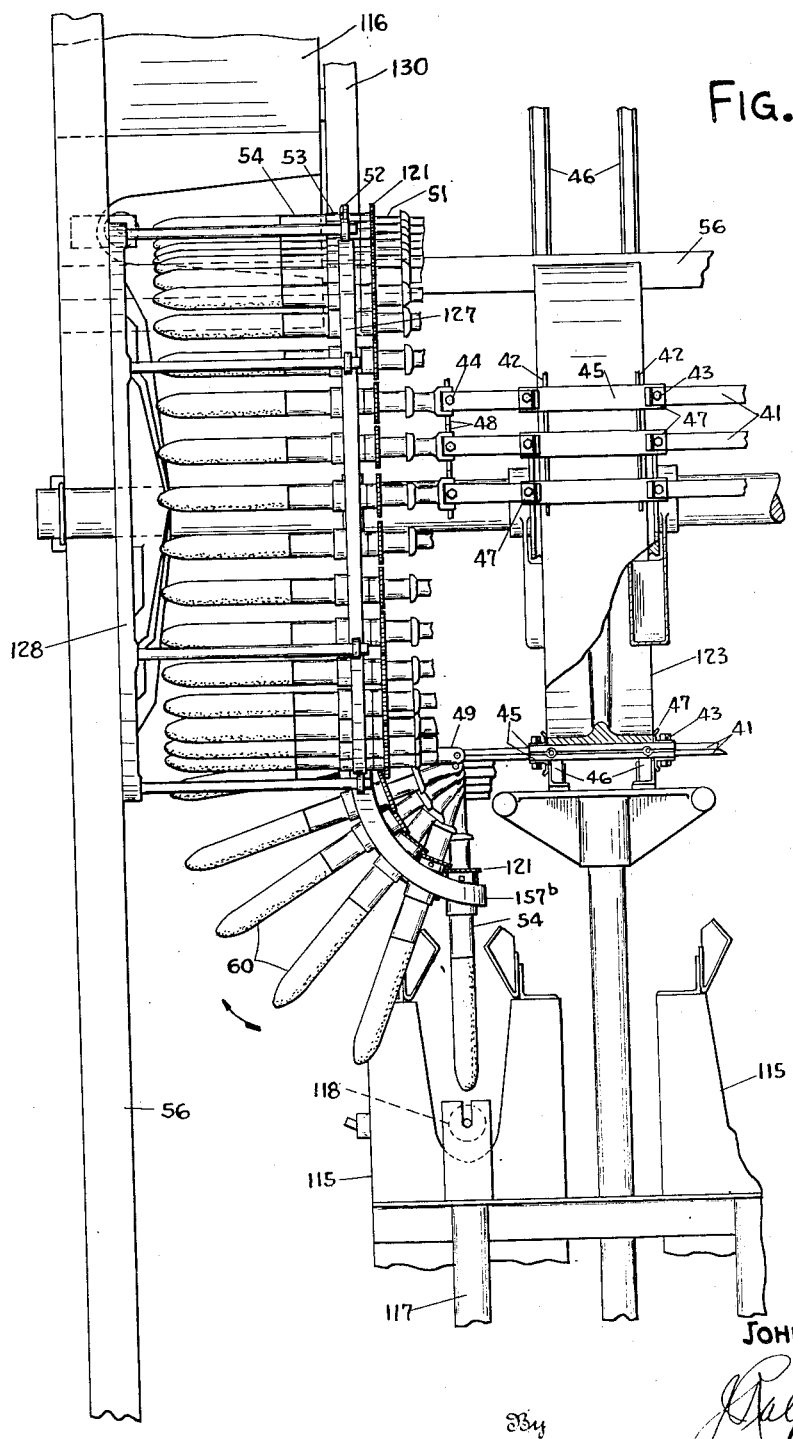
Figure 12 is a view, partly broken away and in section, taken at 12—12 in Figure 11.
Figure 13:
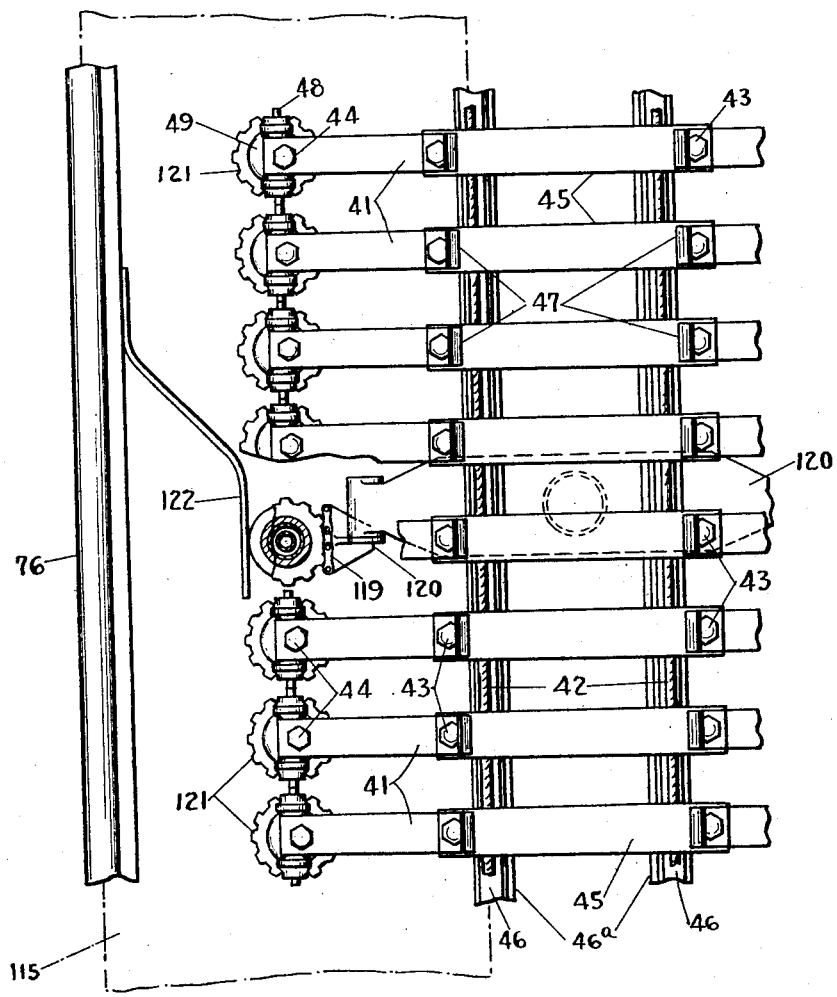
Figure 13 is a fragmentary plan view, partly broken away and in section, taken at 13—13 in Figure 11.
Figure 17:
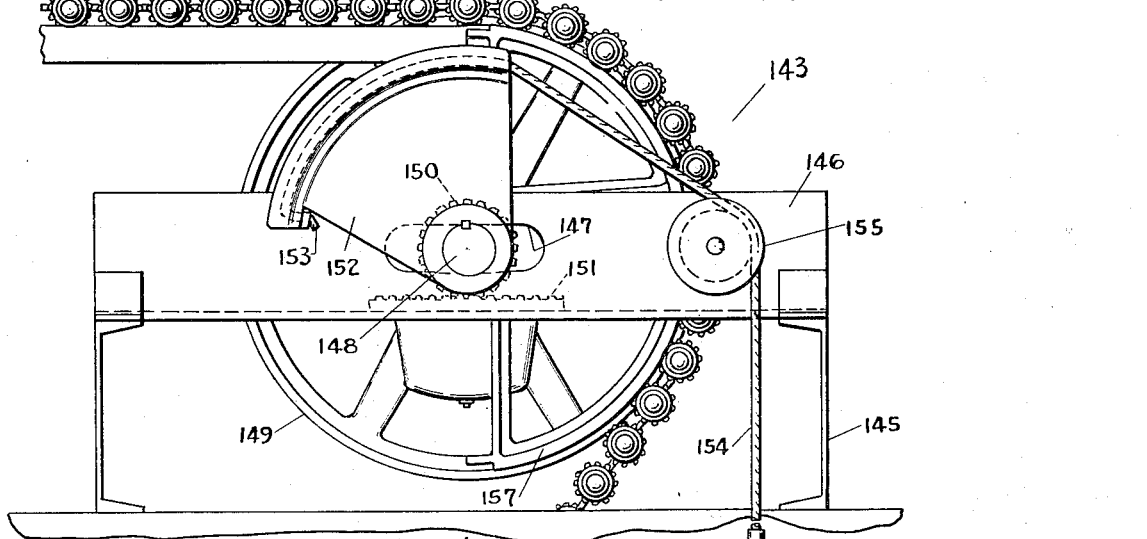
Figure 17 is an enlarged side elevation of a conveyor tensioning unit, of which two are shown in Figures 1 and 2.
Figure 18:
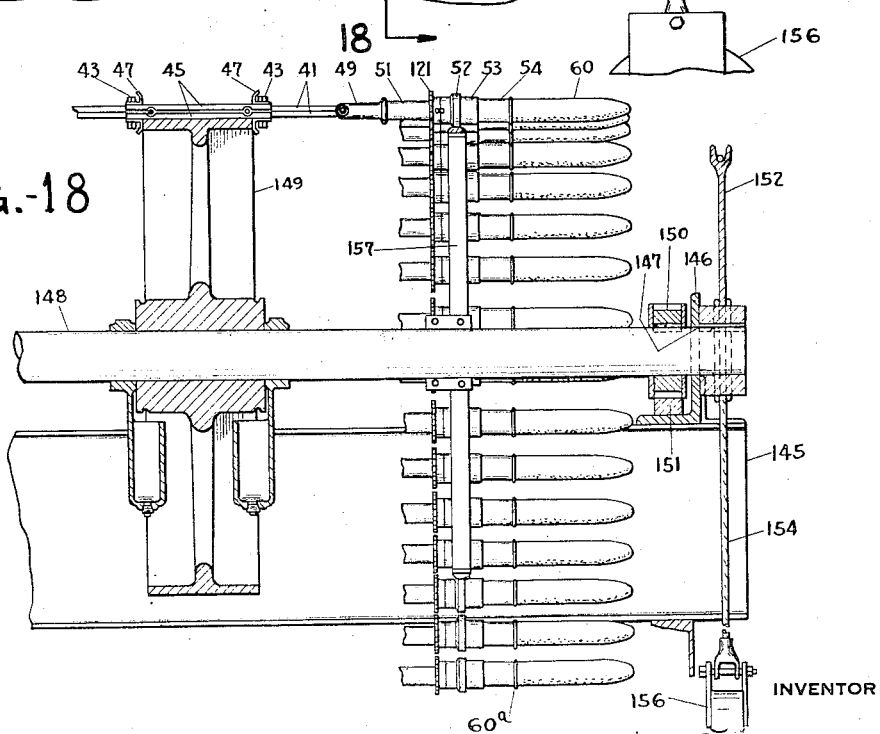
Figure 18 is a fragmentary cross-section on line 18—18 of Figure 17.
Figure 19:
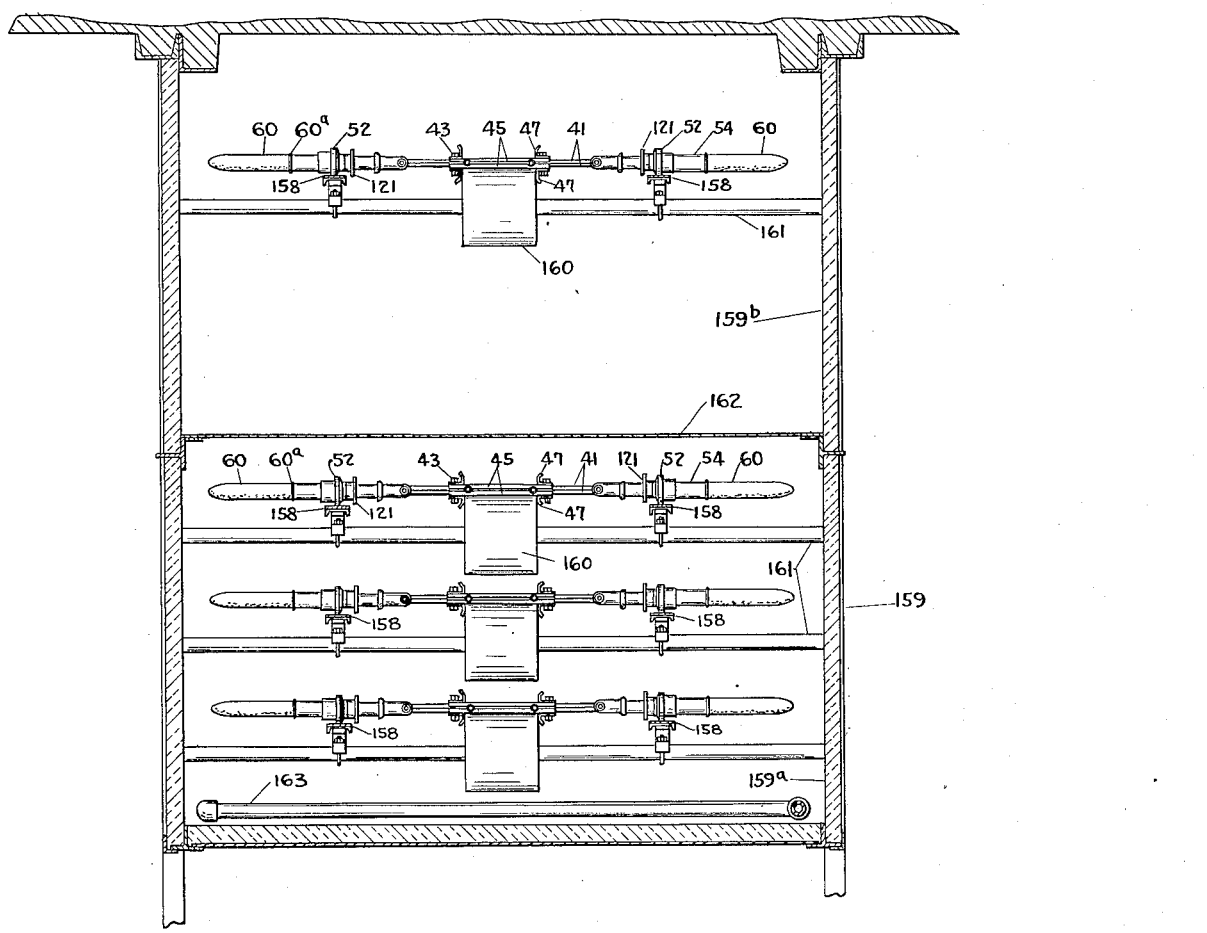
Figure 19 is a typical cross-section through the latex pre-drying chambers taken on line 19—19 of Figure 1.
Figure 20:
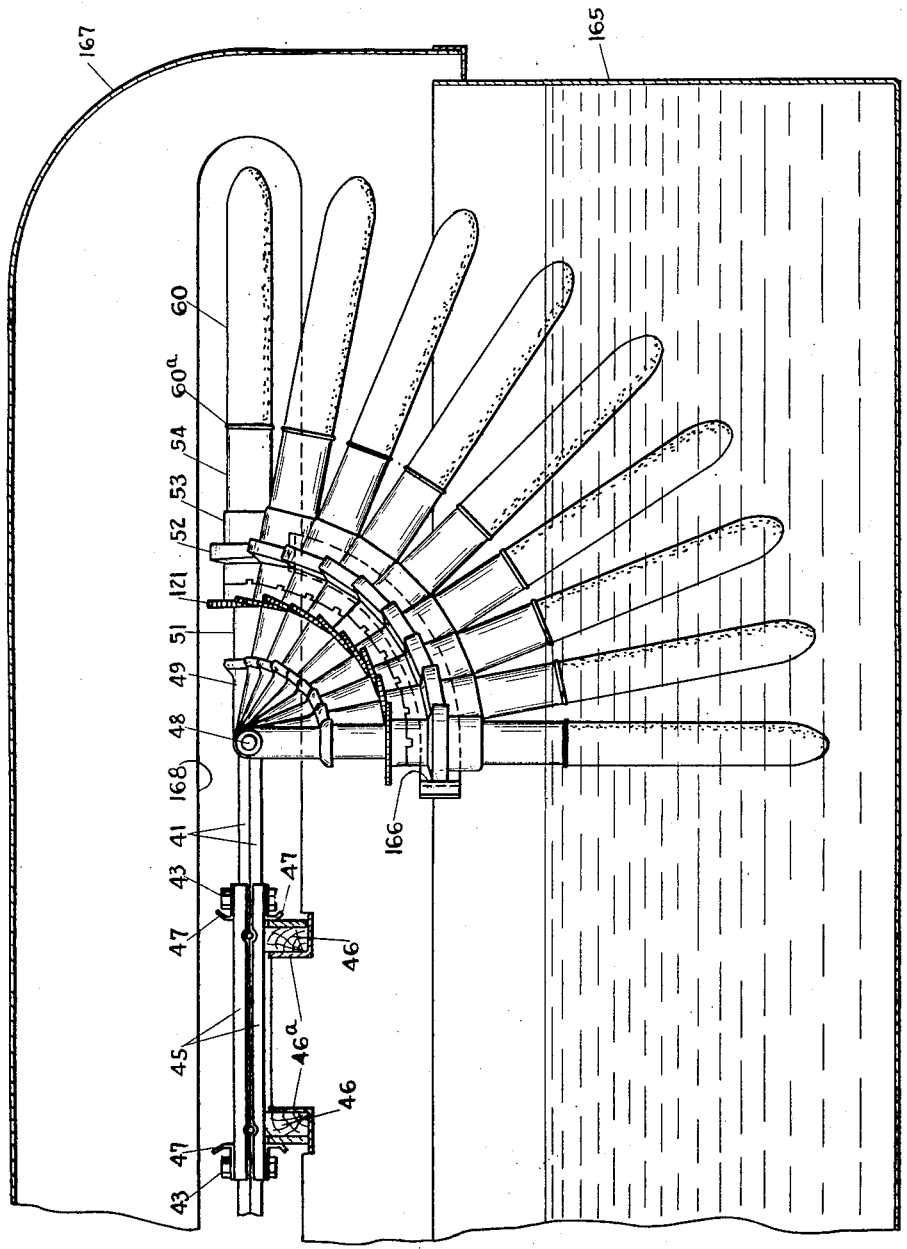
Figure 20 is an enlarged cross-section through one end portion of the vulcanizing tank and taken on line 20—20 of Figure 2.
Figure 21:
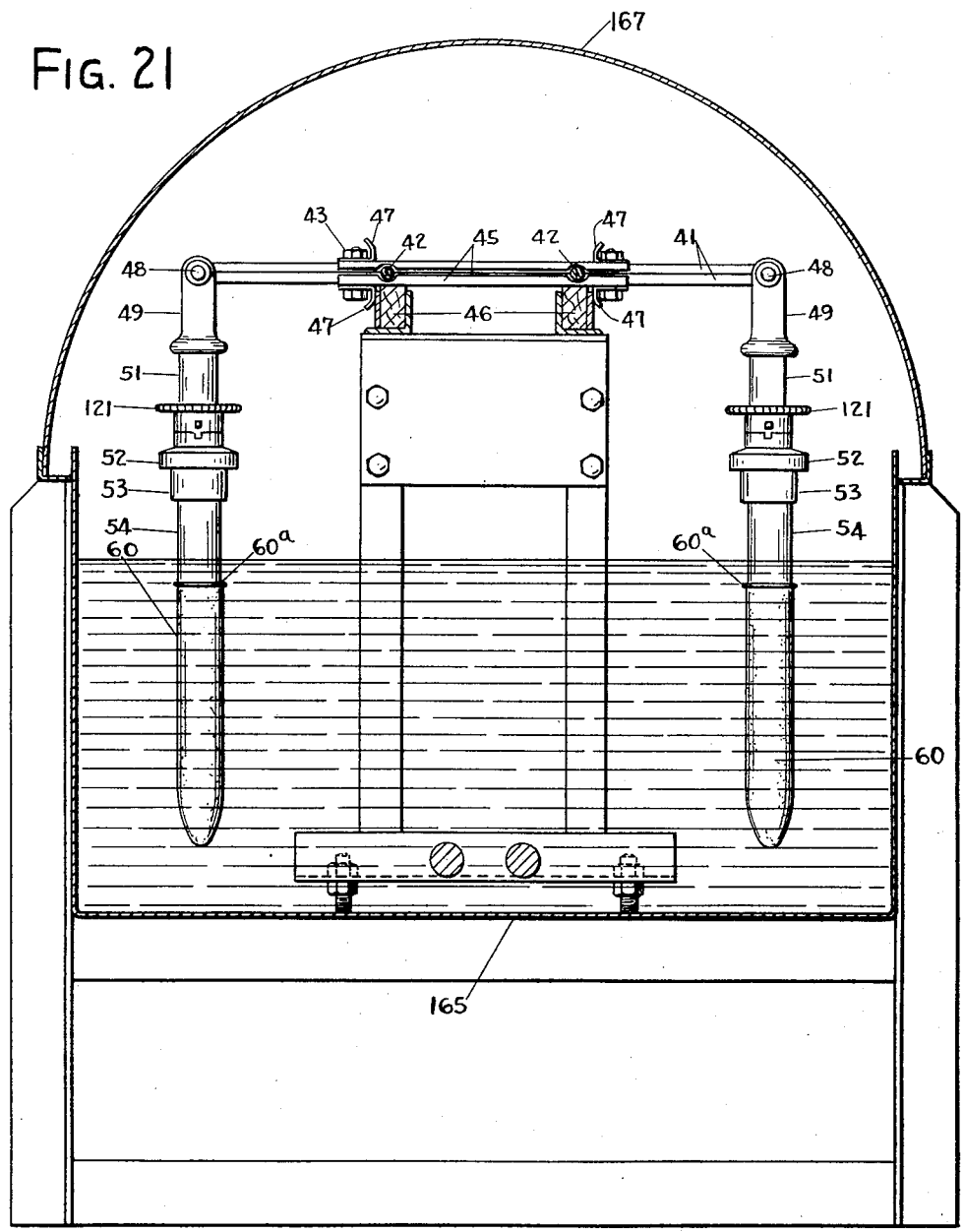
Figure 21 is a typical cross-section through the vulcanizing tank, intermediate the ends thereof, taken for example on line 21—21 of Figure 2.

The forms 54 depending vertically from conveyor 40, upon emerging from latex bath 59, are carried by the conveyor through a series of heating zones which may be provided by longitudinally extending thermostatically controlled radiant heaters 115 and 116 to dry the deposits of latex 60 on the forms prior to succeeding dips or subsequent operations (see Figures 11, 12 and 13). In passing through the first heater 115, mounted on supports 117, 117, conveyor 40 may continue along at the same angle as when passing over the dipping tank 58. So that approximately the same amount of heat will reach every part of the form deposits 60, there may be provided at 119 the requisite amount of sprocket chain, suitably mounted on a conveyor rail support 120, engageable by sprockets 121 fixed to the rotatable form support or roller 52 (Figure 13) to turn each form on its shaft 50 about one quarter of a revolution after it travels approximately one third to half way through the heater. A guide bar or cam 122, suitably supported for example on track member 76, may be arranged to engage rollers 52 to urge the sprockets 121 into positive contact with chain links 119.

Upon leaving heater 115 the rollers 52 may engage tracks or cams 57ᵇ and 57ᶜ to again raise the forms 54 to horizontal position, and a frog or switch 78ª similar to switch 78 may be provided for use when a particular dip is to be avoided as described in connection with the dipping apparatus.

So that the rubber deposits will be sufficiently dried on the forms prior to a succeeding dip or subsequent operation, one or more additional heaters 116 may be supported on the framework 50. To conserve space conveyor 40 may have the course thereof reversed two or more times as by means of idler guide wheels 123, 124 and 125, around the outer peripheries of which the wear-plates of 45 bars engage. Inner and outer curved tracks 126 and 127 supported in a cage members 128 are adapted to be engaged by the rollers 52 smoothly to transpose the horizontally extended forms around the reversing curves in the conveyor. As the conveyor 40 carries the forms 54 through heater 116 the rollers 52 contact a track 130 to retain the forms in horizontal position and at the same time by frictional engagement therewith to rotate the forms.

Drive mechanism

For continuously driving conveyor 40 a motor 131 (see Figure 2) through reduction gearing 132, chains 133 and 134, for driving sprockets 135 and 136 in turn keyed to shafts 137 and 138, respectively, journalled on bearings 140 on a framework 141, preferably drives two or more suitably located drive wheels 139, a typical arrangement of one of these driving connections to conveyor 40 being best shown in Figures 14, 15 and 16. The driving wheels 139 are provided on the outer peripheries thereof with suitably shaped teeth 139ª for meshing between the wear-plates 45 of adjacent conveyor bars 41. The forms 54 in passing around drive wheel 139 may be held in horizontal position by a cage device 128 previously described. When necessary to insure considerable positive contact of conveyor 40 with drive wheel 139, an idler wheel 143 suitably caged at 144 may be mounted on framework 141.

Conveniently located, preferably at extreme ends of the conveyor apparatus are conveyor take-up devices 143, 143 (see Figures 1, 2, 17, and 18). These may comprise a supporting frame 145 having side angles 146 longitudinally slotted at 147 for slidably receiving a shaft 148 upon which is rotatably mounted an idler wheel 149. For maintaining shaft 148 in true position transversely of the conveyor pinions 150 may be provided adjacent each end of the shaft for engagement with racks 151 secured to the angles 146. Fixed on at least one end of shaft 148 may be a quadrant 152 having fixed at 153 one end of a cable 154 which is passed around the curbed outer periphery of quadrant 152 and extends downwardly guided by a pulley 155, and has fixed on its free end a suitable weight 156. The arrangement is such that weight 156 tends to turn shaft 148 in a clockwise direction, thereby tending to rotate pinion 150 on rack 151 and cause the shaft to slide in the slots 147 and taking up slack in the conveyor 40. A curved track 157 mounted on shaft 148 and engageable with rollers 52 maintains the forms in horizontal position when passing around the wheel 149.

The conveyor construction and guiding means previously described, the driving connections to the conveyor bars 41, and the tensioning devices 143 are adapted for moving the conveyor 40, with the forms 54 thereon, continuously and steadily past the various stations, without appreciable jerking movement of the forms, which is particularly desirable during the latex dipping operations at stations D¹, D², and D³. With this apparatus the forms pick up deposits of latex which are uniform and free of ridges or thin spots.

Latex pre-curing chamber

Upon passing from the first tensioning device 143, the forms 54, carried by conveyor 40 and maintained in horizontal position by rollers 52 engaging asbestos or otherwise heat-proofed rails 158, are passed through a latex final drying or pre-curing chamber 159, to thoroughly dry and pre-cure the deposited latex on the forms before the final vulcanizing step. The conveyor 40, supported on rollers 160, 160 rotatably mounted at suitably spaced intervals on fixed shafts 161, 161 in the chamber 159, is preferably guided by flat peripheried idler wheels, similar to those previously described, through a series of convolutions so as to expose the forms to a maximum amount of heating medium in a minimum of space within the drying chamber 159. The chamber 159 preferably is divided into upper and lower compartments 159ª and 159ᵇ by a baffle plate 162 suitably apertured and constructed to permit free circulation of conditioned air or other pre-curing medium from one chamber to the other. A heating coil 163 through which steam or hot water is circulated may be mounted at the bottom of the lower compartment 159ª for heating the circulated air. For circulating and otherwise conditioning the air in chamber 159, there may be provided suitable automatically controlled air-conditioning apparatus 164, 164 of known construction at the extreme ends of the chamber.

The curing tank

Upon emerging from the drying or pre-curing chamber 159 the conveyor 40 is directed past the vulcanizing apparatus V, comprising essentially a long tank 165 containing a suitable vulcanizing agent such as hot water, and tracks or cams 166 for lowering the forms 54 from horizontal to vertical submerged positions (see Figures 1, 2, 20 and 21) at the entering end of the tank, and similar cams for raising the forms back to horizontal position at the leading end of the tank. A hood 167, having narrow openings 168 at the ends thereof to permit passage of the conveyor 40 therethrough, may be provided for tank 165. Communicating through hood 167 with the space above the curing medium in tank 165 is a conduit 169 (Figure 1) from a suitable suction pump (not shown) for drawing impurities from the air.

Intermediate the vulcanizing apparatus V and form washing apparatus W may be a suitable take-off device T for removing the finished goods from the forms. At this point the goods may be conveyed to a testing machine (not shown) to be tested for defects and the perfect goods thereafter packed for shipping.

Form washing equipment

Figures 22 to 27, inclusive, illustrate apparatus for automatically washing and drying the forms before the start of the next succeeding goods manufacturing cycle. As the forms 54 are carried horizontally by conveyor 40 through a housing 170, and rotated positively by translational movement of sprockets 121 in engagement with chains 171, 171, nozzles 172, 172 supplied by piping 173, 173 may be trained upwardly to thoroughly wash the forms by water or steam pressure. Directly above the nozzles there may be arranged to drag over the top of the forms 54 a series of flexible mats 174, 174, preferably of rubber and having diagonally disposed ribs 174ª designed to wipe the excess fluid from the forms as they pass under. The mats 174 may be pivotally connected on arms 175 mounted on the housing 170. A tank 176 is arranged under the nozzles 172 to recover the fluid dropping from the forms.

On passing the mats 174 the forms are carried under a series of flexible pads 177, 177 of water absorbing material such as linen, felt, or the like, and then on further movement thereof are carried over a table 178 covered with a thick padding of similar material 179, in close contacting engagement therewith, whereby most, if not all, of the moisture, dust particles, etc., is removed from the forms.

The conveyor cleaning device

After passing through the washer W and a second tensioning device 143 the conveyor 40 may be guided angularly downwardly to the first dipping unit D¹. Intermediate tensioning device 143 and unit D¹ may be the conveyor cleaning device C for removing and carrying away loose particles from the moving parts of the conveyor to prevent such particles from later dislodging and possibly causing defects in the latex deposited goods.

Supported by a bracket 180 and by the rails 181 which hold the forms 54 in horizontal position is framework 182 to which is secured a boxlike receptacle 183. Box 183 is provided with a relatively narrow opening around its entire periphery to permit passage therethrough of the conveyor 40 with forms 54 preferably protruding at the sides of the box. Mounted within the box 183 adjacent the openings 184 and 185 at the entering and leading ends thereof, there may be pairs of brushes 186, 186 and 187, 187 arranged to substantially seal the openings and to engage all portions of conveyor between the forms on opposite sides as it passes through the box. Communicating with the interior of box 183 is a conduit 188 from a suction pump (not shown) for carrying away particles loosened from the conveyor by the brushes.

Adjustably mounted on frame 182 and a brace 189, also supporting the rails 46 and tracks 181, there may be longitudinally extended hollow platens 190 through which steam or hot water, supplied by piping 191, 191, is circulated to heat the same. These platens preferably are provided on the top surfaces thereof with thick pads of moisture absorbing material 190ª, such as felt, linen, cheese-cloth or the like, over which the forms frictionally and rotatably engage on downward movement of conveyor 40 to thereby remove all traces of moisture from the forms prior to the dipping operation to follow. A flexible mat 192, similar to the mats on the form-washing apparatus, may be hinged to the box 183 at 193 to provide additional wiping action to the forms as they pass the box and also to aid in sealing the side openings 194 in the box to maintain the suction therein.

The operation

In operation conveyor 40 is continuously driven to carry the forms 54 at proper angles into cooperating relation with the various stations. The apparatus is shown installed on two floors of a building E (see Figures 1 and 2) which preferably is air-conditioned in any suitable manner.

The washed and dried forms 54 pass from the platens 190 substantially vertically into the first dipping tank 58 at station D¹ to receive by slow steady withdrawal therefrom a thin smooth deposit of latex or the like, as disclosed in the patent to Robertson, No. 1,792,187. The slow withdrawal in the present instance, however, is accomplished by translation of the vertically extended forms through the latex along an upwardly inclined path, as previously described. Emerging from tank 58 at the end thereof the forms are then passed through radiant heater 115 at station S¹ preliminarily to dry the latex on the forms, after which they pass through the heat of secondary radiant heater 116, past which the forms are rotated on their axes, sufficiently drying the rubber on the forms so that the forms will be ready for a succeeding dipping or subsequent operation. The dipping and drying operations may be repeated in continued sequence at stations D² and S² and again at stations D³ and S³ if required. Any of these combined dipping and drying operations may be omitted at will by diverting the forms over rails 76 through switches 78. At station B reinforcing beads 60ᵃ are rolled on the goods by any suitable type of machine.

Passing from the bead-rolling machines, the forms are carried through the drying oven or chamber 159 where the latex deposits are thoroughly dried in conditioned air at controlled high temperature.

Conveyor 40 now carries the forms through the vulcanizing tank at station V where the deposited latex is subjected to the heat of water at curing temperature, the tank 165 being of such length that the forms are immersed in the curing water a sufficient period of time for complete vulcanization of the goods. Immediately upon leaving the tank 165 the forms are carried past a suitable take-off device T, where the completed goods are removed from the forms to be taken to the testing and packing rooms.

Before starting another cycle of operation the conveyor without interruption passes through the form washing apparatus W, conveyor cleaning device C, and finally past the form-drying apparatus F.

Figures 32 and 33 illustrate a modified form of dipping apparatus which may readily be employed with relatively slight changes to take the place of the apparatus shown in Figure 3. For convenience like parts are given like numerals. The dipping tank 195 operates on the same principle as tank 58 in that the latex bath therein is kept continually moving by means of motor driven propeller 196 through the tank and back through a conduit 197. The top edge of an upturned plate 198 is arranged to provide a communicating opening to conduit 197 and also serves as an overflow device to maintain the latex bath at a predetermined level. A pipe 199 may serve as an overflow outlet or it may communicate with the automatic latex supply apparatus shown in Figures 8, 9 and 10.

Immediately upon the ends of the forms 54 leaving the surface of the latex, at a point near the leading end of the tank, the rollers 52 frictionally engage a cam rail 200 to thereby rotate the forms on their respective mountings 49 and at the same time gradually raise the forms from the vertically extended position to an angle substantially as shown in Figure 33. This rotating and raising of the forms, distributes the drop formed by slow uniform withdrawal from the latex bath over a larger area at the end of the form. Upon reaching a predetermined angle the forms continue at that angle past an electric radiant heater 201 similar to heater 115 while still rotating to set the latex.

In Figures 34 to 37, inclusive, is shown another modified form of dipping apparatus which with relatively slight changes to the conveyor guide means may be substituted in place of the dipping apparatus first described. Conveyor 40, passing under the idler-wheel 55, is guided along in a horizontal plane on a pair of tracks 46ᵇ, 46ᵇ, similar to tracks 46, over a latex dipping tank 205 and a reflector or radiant type heater 206.

Supported by track member 181 and angles 207, 207 on rails 46ᵇ may be a cam or guide rail 208 arranged to be engaged by form rollers 52 to lower the forms 54 into the latex 209 in tank 205 at a relatively slight angle to the surface of the latex, to a depth sufficient to form a deposit of predetermined length. The forms, rotated by frictional engagement of rollers 52 with cam rails 208, are moved through the latex in this manner for a period sufficient to leave a well defined straight top edge on the deposit (see Figure 37).

Upon receiving the requisite latex deposit the forms, by means of cam-rail 208, are raised from the latex bath 209, and while still continuously rotating on their axes, carried over the heating unit 206. While passing over heater 206 the forms by means of undulations 210, 210 on rail 208 are raised and lowered a number of times to alternate positions above and below the horizontal. This step maintains and sets the latex deposits substantially evenly over the form with no appreciable thickened portion adjacent the end of the form.

Tank 205 may be provided with a motor driven propeller 211 mounted in a chamber 212 for causing the latex of the bath 209 to circulate therefrom through opening 213, through chamber 214, over the top edge of plate 215 substantially at the level of the latex bath 209 in receptacle 216, and thence through opening 217 in the opposite wall 218, and through chamber 219 communicating with chamber 212 at the bottom thereof. This arrangement keeps the latex in motion to eliminate air bubbles in the latex bath and to prevent formation of skum on the surface thereof. The tank 205 may be water-jacketed at 220 for cooling the latex.

Figure 38:
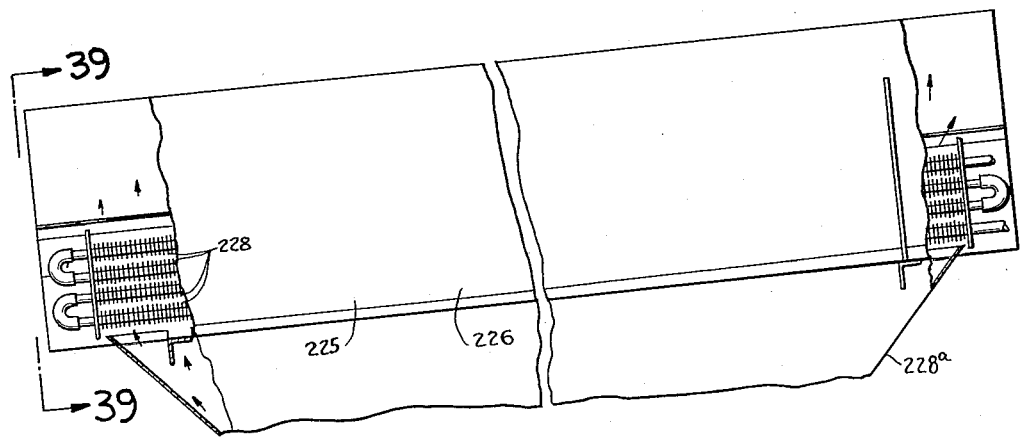
Figure 38 is a side elevation, partly broken away, showing a modified form of pre-setting or preliminary drying heater for use in place of the heaters for a similar purpose shown in Figure 11.
Figure 39:
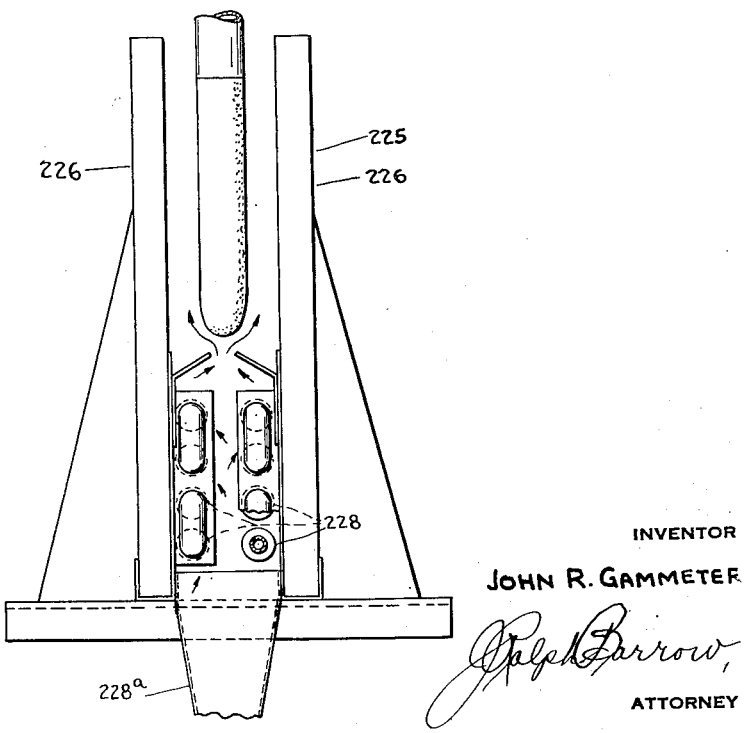
Figure 39 is an end view, taken on line 39—39 of Figure 39.

In Figures 38 and 39 are shown a modified type of latex drying heater 225 adapted to be used in place of the heaters 115 and 116, best shown in Figure 11. The heater 225 may comprise a pair of spaced, suitably heat-insulated, side panels 226, 226 between which the forms pass to dry the latex deposits 60 thereon. The latex-drying heat is provided by circulation of fluid heating medium, such as steam, from a suitable source (not shown) through coils 227, 227 mounted on panels 226. The coils 227 preferably are provided with spaced fins 228, 228 for thoroughly mixing and heating air from a suitable source (not shown), the latter forcing the air under pressure, through a conduit 228ᵃ, up past coils 227 and between the panels 226. Suitable baffle plates, 229, 229 secured to the panels may be provided further to mix the air and insure circulation of the heated air, particularly about the ends of the forms 54.

It is understood that the apparatus shown and described may be used for manufacturing goods in various shapes, and that the invention is not limited to the use of latex, other water dispersions of rubber capable of being deposited on a form by dipping, being contemplated. It also is readily seen that the conveyor apparatus readily lends itself to use with various types of dipping equipment.

Modifications of the invention may be resorted to without departing from the spirit thereof or the scope of the appended claims.

What is claimed is:

1. That method of making dipped goods from latex or water dispersions of rubber which comprises dipping forms in a substantially vertical direction in latex to deposit a film of latex thereon, and translating said forms without rotation through said latex while progressively withdrawing the forms substantially vertically therefrom until the forms pass out of the latex.

2. That method of making dipped goods from latex or water dispersions of rubber which comprises vertically dipping forms in latex to deposit a film of latex thereon, and translating said forms through said latex while progressively withdrawing the forms vertically therefrom until the forms pass out of the latex, and finally passing said forms through a heated zone to dry said deposit thereon.

3. That method of making dipped goods from latex or water dispersions of rubber which comprises vertically dipping heated forms in latex to deposit a film of latex thereon, and translating said forms through said latex while progressively withdrawing the forms vertically therefrom until the forms pass out of the latex, the heat of said forms drying said deposits thereon to retard flow of latex down the forms.

4. That method of making dipped goods from latex or water dispersions of rubber which comprises vertically dipping forms in latex to deposit a film of latex thereon, then translating said forms through the latex in substantially vertical positions while progressively withdrawing the forms from the latex, and heating said forms to dry the deposits thereon until the forms pass out of the latex.

5. That method of making dipped goods from latex or water dispersions of rubber which comprises vertically dipping forms in latex to deposit a film of latex thereon, then translating said forms through the latex in substantially vertical position while progressively withdrawing the forms from the latex, and thereafter as the end of the form leaves the surface of the latex rotating the form on its axis while simultaneously tilting it to an angular position from the vertical, thereby to distribute the drop of latex at the end of the form over a substantial area.

6. That method of making dipped goods from latex or water dispersions of rubber which comprises vertically dipping forms in latex to deposit a film of latex thereon, then translating said forms through the latex in substantially vertical positions while progressively withdrawing the forms from the latex, and thereafter as the ends of the forms leave the surface of the latex, rotating the forms on their axes while simultaneously tilting them to angular positions from the vertical, thereby to distribute the drop of latex at the ends of the form over a substantial area, and heating said forms to dry the deposits thereon.

7. That method of making dipped goods from latex or water dispersions of rubber which comprises the progressive steps of vertically dipping forms in latex and translating the forms through the latex while vertically withdrawing the forms from the latex until the forms pass out of the latex to deposit a film of latex thereon, passing said forms through heated zones to dry said deposits on the forms, repeating said dipping and drying operations to obtain goods of desired thickness, rolling a reinforcing bead at the open ends of the goods, passing the forms through a heated chamber to precure the goods on the forms, passing the forms through a vulcanizing fluid to vulcanize the goods, and finally removing the finished goods from the forms.

8. That method of making dipped goods from latex or water dispersions of rubber which comprises vertically dipping forms in latex to deposit a film of latex thereon, and translating said forms through said latex along an inclined path to the surface thereof until the forms pass out of the latex and while said forms are substantially vertical, thereby progressively withdrawing said forms from the latex.

9. That method of making dipped goods from latex or water dispersions of rubber which comprises dipping a succession of forms in latex to deposit films of latex thereon, translating said forms through said latex along an inclined path to the surface thereof, while said forms are substantially vertical, thereby progressively withdrawing said forms from the latex while still in vertical positions, and finally passing said forms through a heated zone to dry said film thereon.

10. Apparatus for making dipped goods comprising a conveyor having dipping forms thereon, a tank for containing latex or the like in association with said conveyor, and means for guiding said conveyor progressively to translate said forms through said latex along an inclined path relative to the surface thereof while maintaining the forms substantially vertical, the inclination of said path being such that the forms are withdrawn from said tank at a rate whereby the forms will receive a film of latex thereon without appreciable flow after the forms are withdrawn from said latex.

11. Apparatus for making dipped goods comprising a conveyor having dipping forms depending therefrom, a tank for containing latex or the like, means for guiding said conveyor successively to dip said forms in substantially vertical positions in said latex to deposit a film of latex on the forms, and means for guiding said conveyor along an inclined path over said tank whereby the forms are translated through the latex and progressively withdrawn from the latex at a predetermined rate of speed while in said vertical positions, said predetermined rate of speed being such that there will be no appreciable flow of latex from the forms after the surfaces thereof leave the latex.

12. Apparatus for making dipped goods comprising an endless conveyor, rotatable dipping forms carried by said conveyor, one or more dipping tanks, means for lowering said forms while in vertical positions into said latex to deposit a film of latex on the forms, means for guiding said conveyor to move the forms while substantially vertical progressively along an upwardly inclined path to the surface of the latex and thereby progressively to withdraw the forms from the latex, and means for simultaneously rotating the forms and swinging them through an angle as they leave the surface of the latex.

13. Apparatus for making dipped goods comprising a conveyor having heat-conducting parts, hollow dipping forms carried by said conveyor, means for heating said heat-conducting parts of the conveyor, means within said forms but out of direct heat-conducting contact therewith for transmitting heat from said heat-conducting parts of the conveyor to heat the forms from within while the conveyor is in motion, a tank for containing latex in association with said conveyor, and means for guiding said conveyor whereby said forms successively are passed into said latex to deposit a film of latex on the forms, said deposits being dried on said forms by the heat therein from said heat-conducting parts.

14. Apparatus for making dipped goods comprising a conveyor having dipping forms depending therefrom, means for heating said forms from within, a tank for containing latex or the like, means for guiding said conveyor successively to dip said forms in substantially vertical positions in said latex to deposit a film of latex on the forms, and means for guiding said conveyor along an inclined path over said tank whereby the forms are progressively withdrawn from the latex while in said vertical positions, said deposits being dried on said forms by the heat therein, the inclination of said path relative to the surface of the latex being such with regard to the speed of the conveyor that the forms will be withdrawn from said tank at a rate of speed in which there will be no appreciable flow of latex from the forms after the surfaces thereof leave the latex.

15. Apparatus for making dipped goods comprising a dipping tank for containing latex, means for conveying a series of forms through said latex to deposit a film of latex thereon, means for guiding said conveyor along an upwardly inclined path above the surface of said latex progressively to withdraw said forms therefrom, the bottom of said tank being substantially parallel to said path, and means for bypassing the latex from the tank and circulating the latex longitudinally through the tank from one end thereof to the other, whereby the flow of the latex surrounding the forms will be in the direction of travel of said forms.

16. Apparatus for making dipped goods comprising a dipping tank for containing latex, means for conveying a series of forms substantially vertically through said latex to deposit a film of latex thereon, means for guiding said conveyor along an upwardly inclined path above the surface of said latex progressively to withdraw said forms therefrom while maintained in vertical positions, and means for bypassing the latex from the tank and circulating the latex longitudinally through the tank whereby the flow of latex surrounding the forms will be in the direction that said forms move therein.

17. Apparatus of the character described comprising an endless conveyor, spaced rotatable dipping forms carried by said conveyor, means for rotating said forms, means for progressively spraying said forms with fluid to wash the same, flexible yieldable means for progressively engaging said forms for removing excess fluid therefrom, and heat means for thereafter progressively drying moisture remaining on said forms.

18. Apparatus of the character described including an endless conveyor, means for cleaning said conveyor comprising a chamber having inlet and outlet openings for continuous passage of said conveyor therethrough, means for applying suction within said chamber to draw particles of foreign matter from the parts of said conveyor passing through said chamber, and means adjacent said inlet and outlet openings to provide a substantial seal about the conveyor parts upon passing through the openings, said sealing means comprising flexible members adapted to engage about the parts of said conveyor and loosen particles of foreign matter therefrom.

19. Apparatus of the character described including an endless conveyor, means for cleaning said conveyor comprising a chamber having inlet and outlet openings for continuous passage of said conveyor therethrough, means for applying suction within said chamber to draw particles of foreign matter from the parts of said conveyor passing through said chamber, and means adjacent said inlet and outlet openings to provide a substantial seal about the conveyor parts upon passing through the openings, said sealing means comprising flexible brush members adapted to engage about the parts of said conveyor and loosen particles of foreign matter therefrom.

20. Apparatus of the character described comprising an endless conveyor, spaced rotatable dipping forms carried by said conveyor, means for rotating said forms, means for progressively spraying said forms with fluid to wash the same, means for progressively removing excess fluid from said forms, and means for progressively drying said forms, said drying means including a heated platen having a layer of absorbent material thereon, whereby said forms are rolled over said absorbent material to remove substantially all moisture from said forms.

21. Apparatus of the character described comprising an endless conveyor, spaced rotatable dipping forms carried by said conveyor, means for progressively washing said forms with fluid, means for drying said forms preparatory to a dipping operation, said drying means comprising a heated platen having a pad of moisture absorbent material thereon over which said forms roll in frictional engagement therewith.

22. Apparatus for making dipped goods comprising a continuous conveyor having heat-conducting parts along the same, hollow dipping forms carried by said conveyor, a tank for containing latex in association with said conveyor, means for guiding said conveyor whereby said forms successively are passed into said latex to deposit a film of latex on said forms, a heating zone through which said forms are carried by the conveyor for drying said deposits on the forms, said heat-conducting parts of the conveyor being heated upon passing through said zone, and means within said forms but out of direct heat-conducting contact with the forms along substantially the length thereof for transmitting heat retained in said heat-conducting parts of the conveyor to heat said forms from within, thereby to dry said deposits on said forms from within.

23. Apparatus for making dipped goods comprising a continuous conveyor having heat-conducting parts along the same, form mountings carried by said conveyor, hollow dipping forms of low heat conductivity on said mountings, a tank for containing latex in association with said conveyor, means for guiding said conveyor whereby said forms are successively passed into said latex to deposit a film of latex thereon, a heating zone through which said forms are carried by the conveyor for drying said deposits on the forms from without, said heat-conducting parts of the conveyor being heated upon passing through said zone, means within said forms but out of direct heat-conducting contact with the forms along substantially the length thereof for transmitting heat retained in said heat-conducting parts of the conveyor to heat said forms from within, thereby to dry the latex deposits thereon from within, said means within the forms including an element of high heat conductivity extending from said mountings into said forms and a heat-insulating spacer for maintaining said elements in spaced relation to the inside surfaces of the forms.

JOHN R. GAMMETER.